US011865069B2

(12) United States Patent
Dai et al.

(10) Patent No.: US 11,865,069 B2
(45) Date of Patent: Jan. 9, 2024

(54) PNEUMATIC THERAPY APPARATUS AND METHOD WITH OVERLAPPED COMPRESSION

(71) Applicant: JKH Health Co., Ltd., Shenzhen (CN)

(72) Inventors: Quanqin Dai, Diamond Bar, CA (US); Pu Jiang, Shenzhen (CN); Baohua Jiang, Shenzhen (CN)

( * ) Notice: Subject to any disclaimer, the term of this patent is extended or adjusted under 35 U.S.C. 154(b) by 0 days.

(21) Appl. No.: 17/882,881

(22) Filed: Aug. 8, 2022

(65) Prior Publication Data

US 2023/0201068 A1 Jun. 29, 2023

Related U.S. Application Data

(63) Continuation-in-part of application No. 17/564,136, filed on Dec. 28, 2021, now Pat. No. 11,446,202.

(51) Int. Cl.
*A61H 9/00* (2006.01)

(52) U.S. Cl.
CPC ... *A61H 9/0092* (2013.01); *A61H 2201/5025* (2013.01); *A61H 2201/5043* (2013.01); *A61H 2201/5071* (2013.01); *A61H 2209/00* (2013.01)

(58) Field of Classification Search
CPC ...... A61H 9/00; A61H 9/0092; A61H 9/0078; A61H 9/005; A61H 11/00; A61H 2011/005; A61H 7/00; A61B 5/0235; A61F 2007/0091; A61F 5/012
See application file for complete search history.

(56) References Cited

U.S. PATENT DOCUMENTS

2007/0055188 A1* 3/2007 Avni ..................... A61F 13/085 601/151
2007/0282230 A1* 12/2007 Valderrabano ....... A61H 9/0092 601/152
2013/0245519 A1* 9/2013 Edelman ............. A61H 9/0078 601/152
2014/0276294 A1* 9/2014 Mansur, Jr. .......... A61H 9/0078 601/152

(Continued)

FOREIGN PATENT DOCUMENTS

EP 2862547 A1 * 4/2015 ............... A61F 5/01

*Primary Examiner* — Bradley H Philips
*Assistant Examiner* — Savannah L Gabriel
(74) *Attorney, Agent, or Firm* — Arch & Lake LLP

(57) ABSTRACT

The pneumatic therapy apparatus and method with overlapped compression include a wrap and a controller. The wrap includes an outer wrap and an inner air bladder set; the controller can be fixedly connected to, detachably connected to, or separately connected to the outer wrap; the inner air bladder set includes one or more than one set of a first air bladder and a second air bladder that are overlapped; the controller contains an inflating motor and an integrated control board that are electrically connected. The inflating motor that is controlled by the integrated control board inflates the second air bladder first and then the first air bladder to achieve the overlapped compression between the second air bladder and the first air bladder. Therefore, the user can use the pneumatic therapy apparatus and method with overlapped compression to promote blood flow, treat lymphedema, prevent deep vein thrombosis and other diseases, and improve user experience in the treatment areas.

10 Claims, 17 Drawing Sheets

(56) References Cited

U.S. PATENT DOCUMENTS

| | | | | |
|---|---|---|---|---|
| 2014/0303533 | A1* | 10/2014 | Zeutzius | A61H 9/0092 601/151 |
| 2015/0224015 | A1* | 8/2015 | Wilford | A61F 7/02 601/151 |
| 2016/0361224 | A1* | 12/2016 | Ramakrishna | A61H 9/0092 |
| 2017/0231861 | A1* | 8/2017 | Noso | B60N 2/976 601/149 |
| 2019/0125619 | A1* | 5/2019 | Zeutzius | A61H 9/0078 |
| 2020/0237607 | A1* | 7/2020 | Ramanan | A61H 9/0092 |
| 2021/0291478 | A1* | 9/2021 | Ingalls | E01C 5/22 |
| 2022/0241137 | A1* | 8/2022 | Solana | A43B 7/146 |

* cited by examiner

PNEUMATIC THERAPY APPARATUS AND METHOD WITH OVERLAPPED COMPRESSION

TECHNICAL FIELD

The invention relates to a pneumatic physiotherapy apparatus, especially a pneumatic physiotherapy apparatus with a unique structure.

BACKGROUND

The pneumatic physiotherapy apparatus is used to repeatedly inflate and deflate one or more air bladders wrapped on the extremities and other body areas to form sequential compression, thereby promoting blood flow to prevent or treat some diseases, such as deep vein thrombosis. In order to achieve sequential compression from the distal to the proximal, the prior art usually includes a wrap and a controller that are connected with or without exposed tubes. The wrap applies a divider (also called an isolation peninsula) in the middle area of its inflatable air bladder to separate the first lower section and the second upper section, or uses more than one air bladder to form an air flow passageway from the distal to the proximal. During the period of inflation, the air flow first enters the distal, and then flows to the proximal through the air flow passageway, so that the first and second sections of the air bladder or the more than one air bladder will reach the preset pressure. However, the divider of the air bladder or the seam between each other of the air bladders cannot be inflated, resulting in little or no air pressure on the divider or seam of the air bladder. In other words, the treatment area around the divider or seam may not be able to reach the required pressure, and there are blind spots and shortcomings with insufficient pressure. Therefore, the whole treatment area may not be able to reach the full coverage of compression during use, which can affect the user experience and even the treatment effectiveness. Therefore, further improvements are necessary.

SUMMARY

The purpose of the invention is to provide a pneumatic physiotherapy apparatus with a unique structure to overcome the problems set forth above in the prior art. A pneumatic physiotherapy apparatus with a unique structure designed for this purpose includes a wrap and an operating unit. The wrap includes at least an outer wrap, an inner component housing, and an inner air bladder set (also with the heating/cooling components included if applied); the operating unit is fixed to the outer wrap and connected to the component housing to operate the components inside the component housing; the component housing contains components of an inflation motor and an integrated control board that are electrically powered by the battery inside the component housing or by a battery bank/AC adapter outside the component housing; the inner air bladder set includes the one or more than one air bladder that is inflatable. The inflation motor that is controlled by the integrated control board inflates the inner air bladder set.

The component housing also contains a solenoid valve and a pressure detection valve; the solenoid valve, pressure detection valve, and the inflation motor are electrically connected to the integrated control board. When the inflation pressure inside the air bladder reaches a preset value, the pressure detection valve detects and sends signals to the integrated control board. After receiving signals, the integrated control board will stop the inflation motor. After the inflation motor stops, the air bladder set will immediately deflate, or maintain a preset pressure for a certain period of time prior to deflation.

A single or multiple control button is provided on the front or side of the operating unit; the control button can be a convex button, a concave button, a flat button, or a touch button. A display indication is arranged on the front or side of the operating unit; the indication can be a digital display, an LCD display screen, or alight indicator(s).

A component housing is fixedly arranged inside the wrap. The component housing contains several screw posts and/or buckle grooves, and is fixedly connected to the operating unit through the screw posts and/or buckle grooves to form an integrally fixed connection between the operating unit and the component housing.

The wrap can be used to cover different treatment areas, including leg, arm, buttock, waist, or other body areas.

Through the above-mentioned improvements, the invention is provided with a wrap and an operating unit: The wrap includes at least an outer wrap, an inner component housing, and an inner air bladder set; the operating unit is fixed to the outer wrap and connected to the component housing to operate the components inside the component housing.

In U.S. Ser. No. 10/966,729B1 the controller is fixed to the wrap through a connecting bracket, and all the components are protectively housed in the controller.

U.S. Ser. No. 10/966,729131 "pneumatic physiotherapy apparatus with optimized compression" is hereby fully incorporated by reference.

In comparison, the present invention has an operating unit outside the wrap. Most or all of the components are protectively housed in the component housing, and the operating unit is just used by the user to control the components in the component housing.

Therefore, compared to the prior art with a bulky controller, this invention only exposes a small operating unit and hides the component housing of all the bulky components inside the wrap. Such a unique structure allows us to experience the extraordinary beauty of pneumatic physiotherapy apparatuses, and also allows us to remove the connecting bracket in U.S. Ser. No. 10/966,729B1. Furthermore, the present invention makes the exposed operating unit much smaller than the exposed controller in U.S. Ser. No. 10/966,729B1.

In general, this invention has the characteristics of simple and reasonable structure, excellent performance, convenient use, reliable comfort, and strong practicability. Therefore, users may be more willing to use the pneumatic physiotherapy apparatus of this invention to enhance their experience, improve blood circulation, relieve pain, prevent deep vein thrombosis, and treat lymphedema and other diseases.

In addition, a pneumatic therapy apparatus and method with overlapped compression designed for this purpose include a wrap and a controller. The wrap includes an outer wrap and an inner air bladder set; the controller is fixedly connected to, detachably connected to, or separately connected to the outer wrap; the inner air bladder set includes the first air bladder and the second air bladder that are overlapped; the controller contains an inflation motor and an integrated control board that are electrically powered by a single battery or multiple batteries inside the controller or by a battery bank/AC adapter/power supply outside the controller. The inflation motor that is controlled by the integrated control board inflates the second air bladder first and then flows into the first air bladder to achieve the overlapped compression between the second air bladder and the first air bladder.

The size of the first air bladder is bigger than that of the second air bladder, and the second air bladder is located outside the lower section of the first air bladder. The boundary of the first air bladder is seal welded with one or more than one air flow holes on its lower section. The boundary of the second air bladder is seal welded on the lower section of the first air bladder, making the second air bladder cover the air flow hole(s) on the first air bladder. There is a flow nozzle on the second air bladder for the air to inflate into the second air bladder. The air flow hole(s) on the lower section of the first air bladder creates one or more than one air flow passageways between the first air bladder and the second air bladder. Through the air flow passageway, the air flow enters the first air bladder from the second air bladder.

There are a first connection tubing between the flow nozzle and the inflation motor. The flow nozzle is connected to the inflation motor through the first connection tubing. The inflation motor controlled by the integrated control board generates air flow; the air flow from the inflation motor enters the second air bladder through the first connection tubing and the flow nozzle. When the air pressure in the second air bladder rises to a certain level, the air flow starts to enter the first air bladder from the second air bladder through the air flow passageway.

The controller also contains a solenoid valve and a pressure detection valve; the solenoid valve, pressure detection valve, and the inflation motor are electrically connected to the integrated control board. The first air bladder includes an optional nozzle on its upper section. There are a second connection tubing between the optional nozzle and the pressure detection valve; the optional nozzle is connected to the pressure detection valve via the second connection tubing. When the inflation pressure inside the first air bladder and the second air bladder reaches a preset value, the pressure detection valve detects and sends signals to the integrated control board. After receiving signals, the integrated control board will stop the inflation motor. After the inflation motor stops, the first air bladder and the second air bladder will maintain the preset pressure for a certain period of time prior to deflation, or immediately deflate through the inflation or optional nozzle, the connection tubing, and the solenoid valve in sequence.

A single or multiple control button is provided on the front or side of the controller; the control button can be a convex button, a concave button, a flat button, or a touch button. A display indication is arranged on the front or side of the controller; the indication can be a digital display, an LCD display screen, or a light indicator.

The wrap can be used to cover different treatment areas, including leg, arm, buttock, waist, or a combination of the above.

The connection between the controller and the wrap can be integrally fixed, attached/detached, or separated via tubing.

For the integrally fixed connection between the controller and the wrap, a connecting bracket is fixedly arranged inside the outer wrap. The connecting bracket contains several screw posts and/or buckle grooves, and is fixedly connected to the controller through the screw posts and/or buckle grooves to form an integrally fixed connection between the controller and the wrap.

In an alternative embodiment of the attached/detached connection between the controller and the wrap, a connecting bracket is fixedly arranged on the outer wrap. The connecting bracket contains a number of sliding grooves, snapping grooves, magnetic buckles, or concealed buckles; and the connecting bracket is detachably connected to the controller through the sliding grooves, snapping grooves, magnetic buckles, or concealed buckles, to form a detachable connection between the controller and the wrap.

In another alternative embodiment, an external air tubing is provided between the controller and the wrap, and the external air tubing is used to form a separate connection between the controller and the wrap.

The controller optionally contains a USB interface on its front or side for transferring usage data, a pluggable memory card on its front or side for recording the usage data, or a Bluetooth module inside for transferring the usage data.

Through the above-mentioned improvements, the invention is provided with a first air bladder and a second air bladder that are overlapped. The size of the first air bladder is larger than that of the second air bladder, and the second air bladder is located outside the lower section of the first air bladder. When working, the inflation motor controlled by the integrated control board first inflates the second air bladder, and then enters the first air bladder from the second air bladder through the air flow passageway between the first air bladder and the second air bladder. This method of inflation achieves an overlapped compression between the first air bladder and the second air bladder, and effectively avoids blind spots and shortcomings in the prior art. Therefore, users can use the pneumatic therapy apparatus and method of this invention to promote blood flow, treat lymphedema, prevent deep vein thrombosis and other diseases, and improve user experience in the treatment areas (such as limbs).

In general, this invention has the characteristics of simple and reasonable structure, excellent performance, convenient use, and strong practicability.

DETAILED DESCRIPTION

Figure 1:
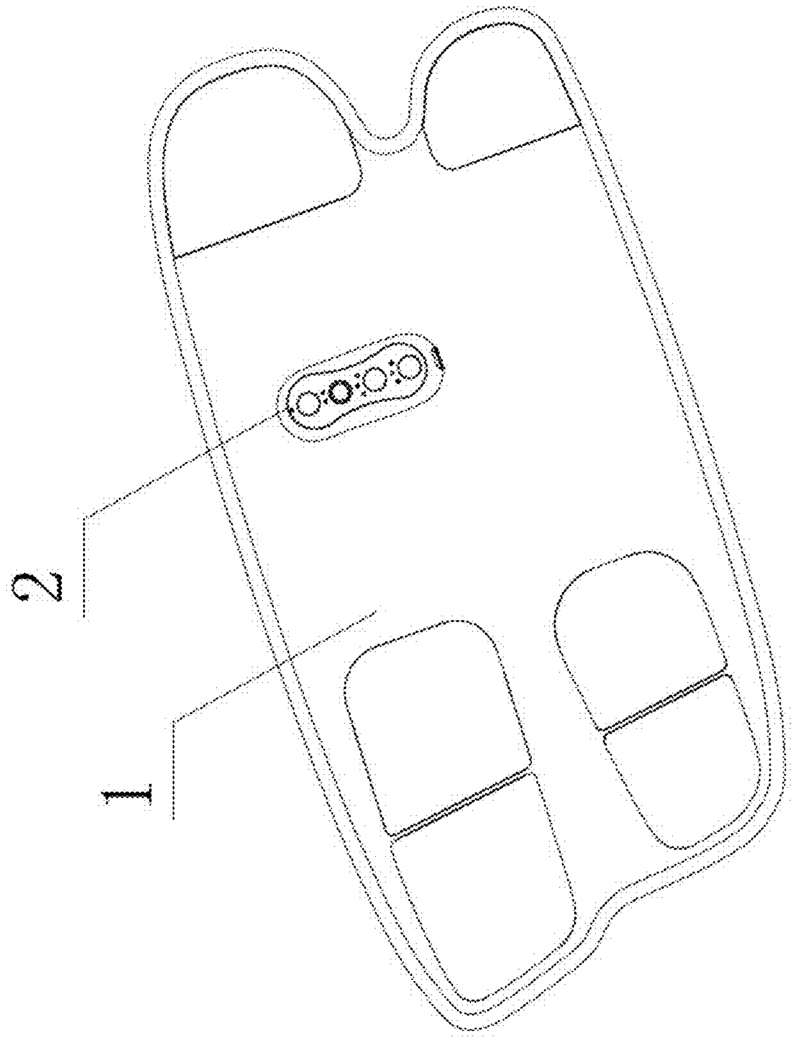
FIG. 1 is a schematic diagram of the first embodiment of the present invention.
Figure 2:
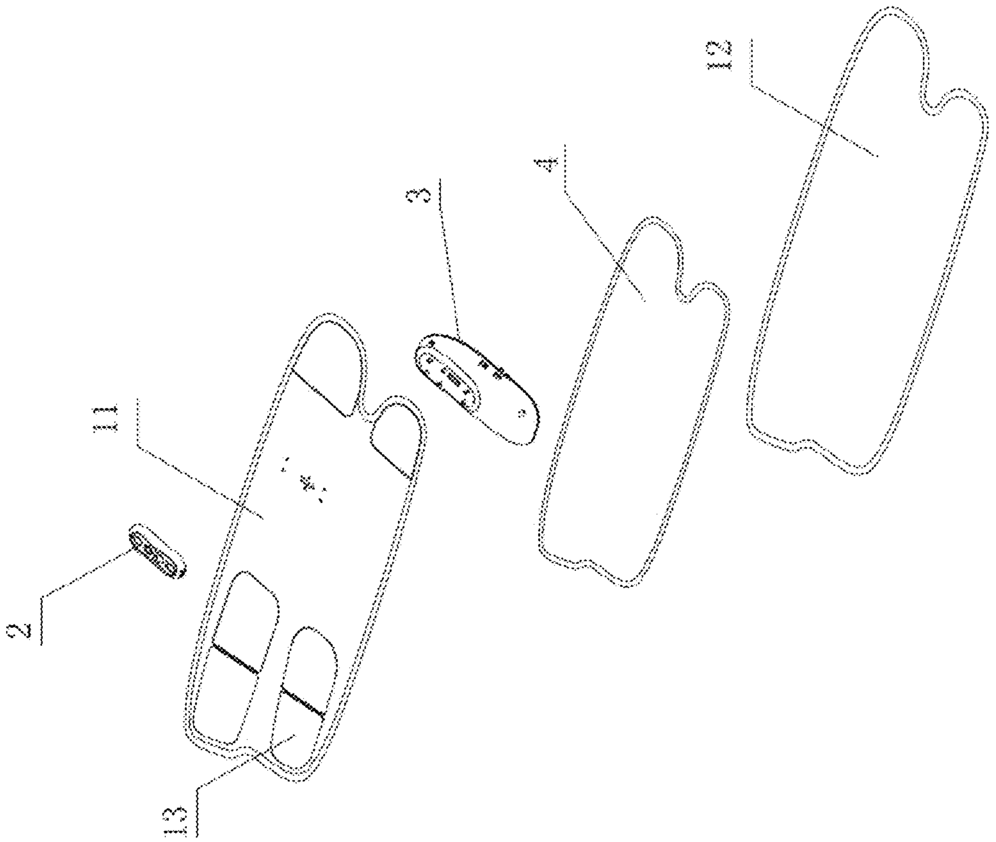
FIG. 2 is a schematic diagram of the exploded structure of the first embodiment of the present invention.
Figure 3:
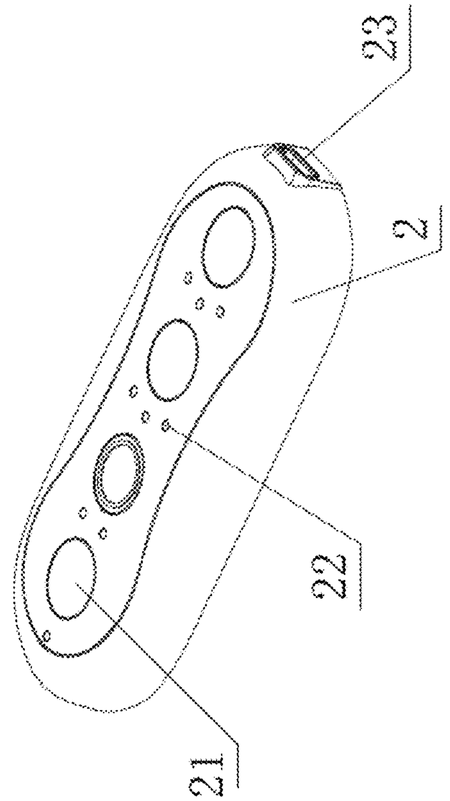
FIG. 3 is a schematic diagram of the operating unit of the first embodiment of the present invention.
Figure 4:
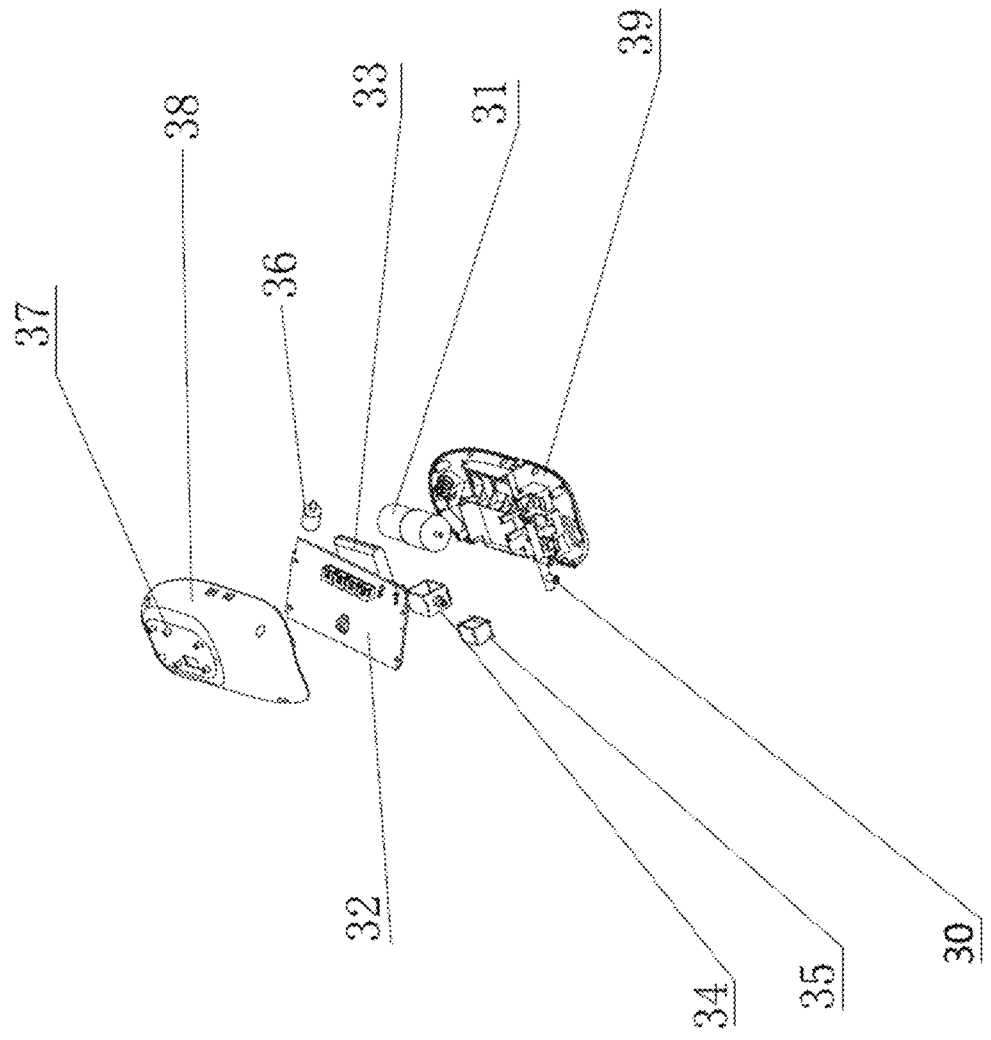
FIG. 4 is a schematic diagram of the component housing of the first embodiment of the present invention.

The present invention will be further described below with reference to the drawings and embodiments.

The First Embodiment

Referring to FIGS. 1 to 4, the pneumatic physiotherapy apparatus with a unique structure includes a wrap 1 and an operating unit 2. The wrap 1 includes at least an outer wrap (such as an upper outer wrap 11 and a lower outer wrap 12), an inner component housing 3, and an inner air bladder set 4; the operating unit 2 is fixed to the wrap 1 and connected to the inner component housing 3 to operate the components inside the inner component housing 3; the inner component housing 3 contains components of an inflation motor 31 and an integrated control board 32 that are electrically powered by the battery 33 inside the inner component housing 3 or by a battery bank/AC adapter outside the inner component housing 3; the inner air bladder set 4 includes one or more than one air bladders that are inflatable. The inflation motor 31 that is controlled by the integrated control board 32 inflates the inner air bladder set 4. There is no outer component housing.

Specifically, the inner component housing 3 is arranged inside the wrap 1. The inner component housing 3 contains most or all components needed for a pneumatic physiotherapy apparatus, and is hidden inside the wrap 1. The inner component housing 3 is hidden inside the wrap 1, such that it cannot be seen from outside the apparatus. Therefore, the exposed operating unit 2 connected to the inner component housing 3 becomes attractive.

The inner component housing hidden inside the wrap is not small. Instead, the exposed operating unit is outside the wrap and is small, compared to the inner component housing.

In order to detect and control the air pressure, the inner component housing 3 also contains a solenoid valve 34 and a pressure detection valve 35. The solenoid valve 34, pressure detection valve 35, and the inflation motor 31 are electrically connected to the integrated control board 32. When the inflation pressure inside the air bladder set 4 reaches a preset value, the pressure detection valve 35 detects and sends signals to the integrated control board 32. After receiving signals, the integrated control board 32 will stop the inflation motor 31. After the inflation motor 31 stops, the air bladder set 4 will immediately deflate, or maintain a preset pressure for a certain period of time prior to deflation.

In order to avoid the safety concern caused from the excessive pressure in the air bladder set 4, a pressure protection valve 36 can be equipped in the inner component housing 3. When the pressure inside the air bladder set 4 is excessive and beyond an allowable pressure range, the pressure protection valve 36 will be activated, and the excessive pressure will release from the air bladder set 4.

The excessive pressure level varies. For example, if the maximum preset pressure is 50 mmHg, any pressure higher than 50 mmHg and its tolerance will be excessive. If the maximum preset pressure is 120 mmHg, any pressure higher than 120 mmHg and its tolerance will be excessive. In addition, the inner component housing 3 also contains several screw posts and/or buckle grooves 37. The inner component housing 3 is fixedly connected to the operating unit 2 through the screw posts and/or buckle grooves 37 to form an integrally fixed connection between the operating unit 2 and the inner component housing 3. The inner component housing 3 also includes a first housing 38 and a second housing 39; the first housing 38 and the second housing 39 are fixedly connected to each other, and form a cavity. The cavity is used to load the components including the inflation motor 31, the integrated control board 32, the battery 33, the solenoid valve 34, the pressure detection valve 35, and the pressure protection valve 36. One or more than one connection tubing 30 and wiring may be needed to make connection between the above components.

For ease of use, a single or multiple control button 21 is provided on the front or side of the operating unit 2; the control button 21 can be a convex button(s), a concave button(s), a flat button(s), or a touch button(s). The user can use the control button 21 on the operating unit 2 to operate the pneumatic physiotherapy apparatus with a unique structure of this invention. A display indication 22 is arranged on the front or side of the operating unit 2; the display indication 22 can be a digital display, an LCD display screen, or a light indicator(s). The user can observe the working state of the operating unit 2 through the display indication 22 when in use. In addition, a charging port 23 is provided on the front or side of the operating unit 2, and used to charge the battery 33 in the component housing 3.

The wrap 1 can be used to cover different treatment areas, including calf, foot, leg, arm, buttock, waist, or other body areas. The wrap 1 in this first embodiment is for the body area of calf, and is used as an example for description. In use, a user wears the wrap 1 on the calf via the Velcro 13, and simply operates the operating unit 2 to achieve a preset pressure compression for compression treatment. This invention of a pneumatic physiotherapy apparatus has the characteristics of simple and reasonable structure, excellent performance, convenient use, reliable comfort, and strong practicability. Therefore, the user can use this invention to enhance use experience, improve blood circulation, relieve pain, prevent deep vein thrombosis, and treat lymphedema and other diseases.

The invention improves blood flow or circulation, and relieves pain, because the invention is a type of powered inflatable tube device, which "is a powered device intended for medical purposes, such as to relieve minor muscle aches and pains and to increase circulation. It simulates kneading and stroking of tissues with the hands by use of an inflatable pressure cuff."

Lymphedema has no known cure in modern medicine, and one potential symptom of lymphedema is that "[t]ime of venous outflow period of blood flow pulse was lower in lymphedema-affected arms than in healthy normal or lymphedema nonaffected arms." From the journal "Lymphatic research and biology", article "Segmental Blood Flow and Hemodynamic State of Lymphedematous and Nonlymphedematous Arms", section "Methods and Results", March 2011.

Therefore, by utilizing the present invention, a user could increase blood flow to their arms, and thus counteract the lymphedema-caused low blood flow. Regular blood flow may ease the pain that a user feels in his/her arms, and may help the user perform regular activities in a better manner than with low blood flow.

"Accesses that show a large (>15%) decrement in vascular access blood flow are associated with a high risk of thrombosis. Serial measurements of vascular access blood flow predict access thrombosis." From the journal "Kidney International", article "Change in access blood flow over time predicts vascular access thrombosis", November 1998.

Therefore, a user who utilizes the present invention can improve their blood flow, and help to prevent thrombosis.

In order for the user to view the usage data of the pneumatic physiotherapy apparatus with a unique structure, the front or side of the operating unit 2 is optionally provided with a USB interface. The operating unit 2 can connect to the data cable and the computer through the USB interface to read the usage data. In an alternative embodiment, a memory card can be optionally provided on the front or side of the operating unit 2. When the memory card is plugged into the front or side of the operating unit 2, the memory card can record the usage data of the pneumatic physiotherapy apparatus with a unique structure. In another alternative embodiment, the operating unit 2 or the component housing 3 is optionally equipped with a Bluetooth module, and the user can wirelessly connect a smart device (such as a smart phone) to the Bluetooth module to read the usage data of the pneumatic physiotherapy apparatus with a unique structure.

Optionally, the usage data can then be analyzed through artificial intelligence in order to determine optimal patterns for using the pneumatic physiotherapy apparatus with a unique structure. For example, perhaps a user prefers using the apparatus in a certain rhythm, then the artificial intelligence can learn that rhythm and utilize it again in case the person forgets, or perhaps use the rhythm on a different person in order to determine whether the new person enjoys the same rhythm as the original person. Instead of a rhythm, the artificial intelligence might also learn a certain series of buttons that the user likes being pushed, and this pattern could be remembered and shared by the artificial intelligence. Another possibility is that the artificial intelligence could analyze the usage data and could determine certain body parts that a person likes to use the apparatus on. Another possibility is that the artificial intelligence could analyze the usage data and could determine the optimal amount of time that a user wants the apparatus on particular body parts. It's also possible that the usage data could be analyzed by experts in the field, and they could provide recommendations.

Some optional alternatives to artificial intelligence are machine learning, deep learning, and neural networks, each of which could fulfill the same functions as listed above.

The Second Embodiment

In this second embodiment, the wrap 1 also includes an extra heating layer 5, in addition to the outer wrap (such as an upper outer wrap 11 and a lower outer wrap 12), the inner component housing 3, and the inner air bladder set 4.

Figure 5:
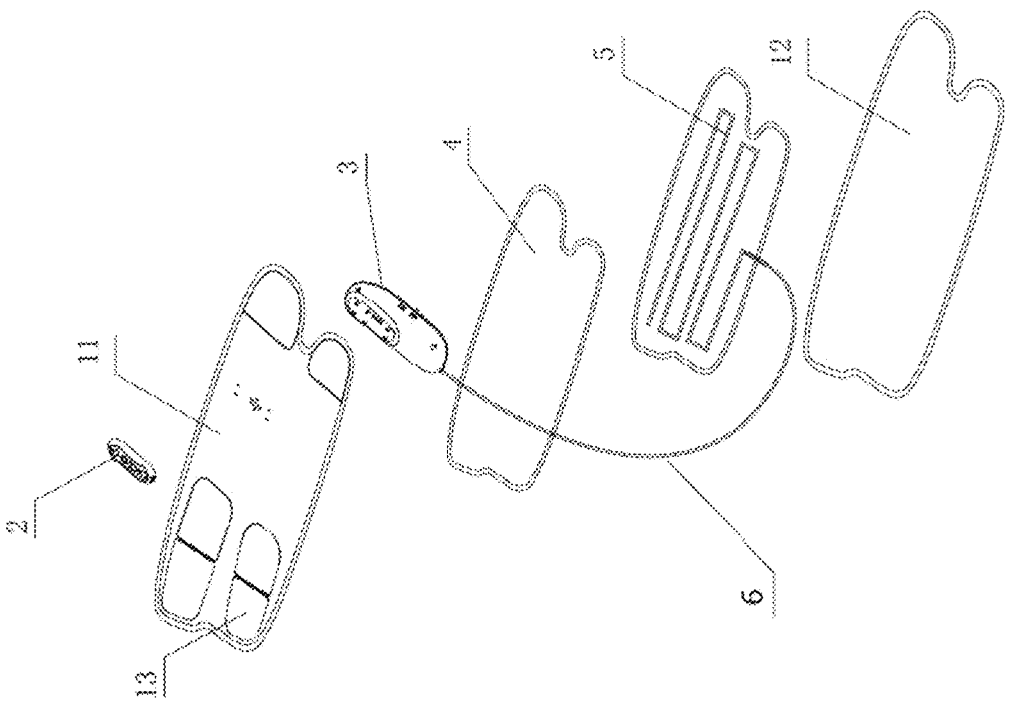
FIG. 5 is a schematic diagram of the exploded structure of the second embodiment of the present invention.

Referring to FIG. 5, the difference between this second embodiment and the first embodiment is that the wrap 1 includes an extra heating layer 5 in this second embodiment. Therefore, this second embodiment can also provide a heating treatment in addition to the compression treatment.

Specifically, the extra heating layer 5 is electrically connected to the component housing 3 via a conductive wire or another conductive connection 6. And the operating unit 2 will have the respective control button 21 to control the heating treatment. The conductive wire or another conductive connection 6 may be made of copper.

Other undescribed parts in this second embodiment are the same as in the first embodiment.

The Third Embodiment

In this third embodiment, an external patch 7 is attached to and detached from the wrap 1, and the external patch 7 is used to provide hot/warm and/or cold/cool treatment.

Figure 6:
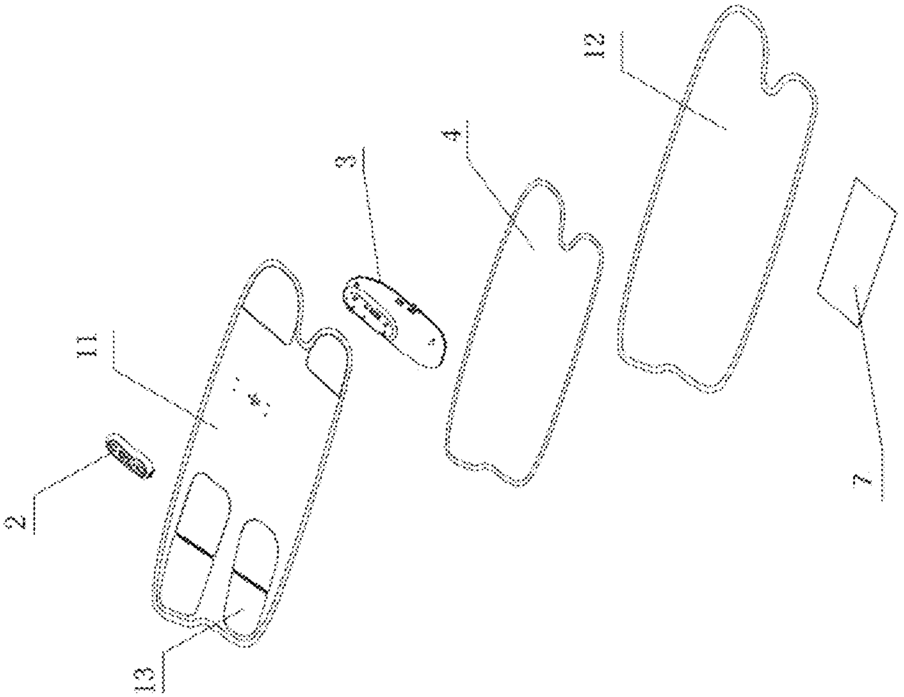
FIG. 6 is a schematic diagram of the exploded structure of the third embodiment of the present invention.

Referring to FIG. 6, the difference between this third embodiment and the first embodiment is that an external patch 7 is attached to and detached from the wrap 1 in this third embodiment. Therefore, this third embodiment can also provide the hot/warm and/or cold/cool treatment in addition to the compression treatment.

The external patch 7 may be shaped as a rectangle, or may be of a different shape that is more comfortable to the user, or more accurately fits a body part that the user wants to use the external patch 7 on.

Other undescribed parts in this third embodiment are the same as in the first embodiment.

The Fourth Embodiment

Figure 7:
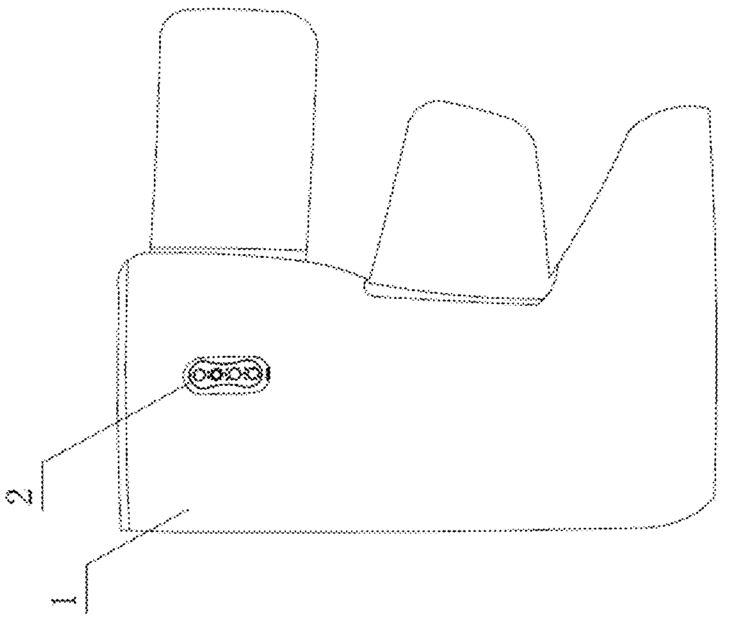
FIG. 7 is a schematic diagram of the fourth embodiment of the present invention.

In addition to the calf, this invention can be also used to cover other body treatment areas, including the foot, leg, arm, buttock, waist, or other body areas. In this fourth embodiment (FIG. 7), the wrap 1 is for the body area of the foot and calf.

Other undescribed parts in this fourth embodiment are the same as in the first embodiment.

The Fifth Embodiment

Figure 8:
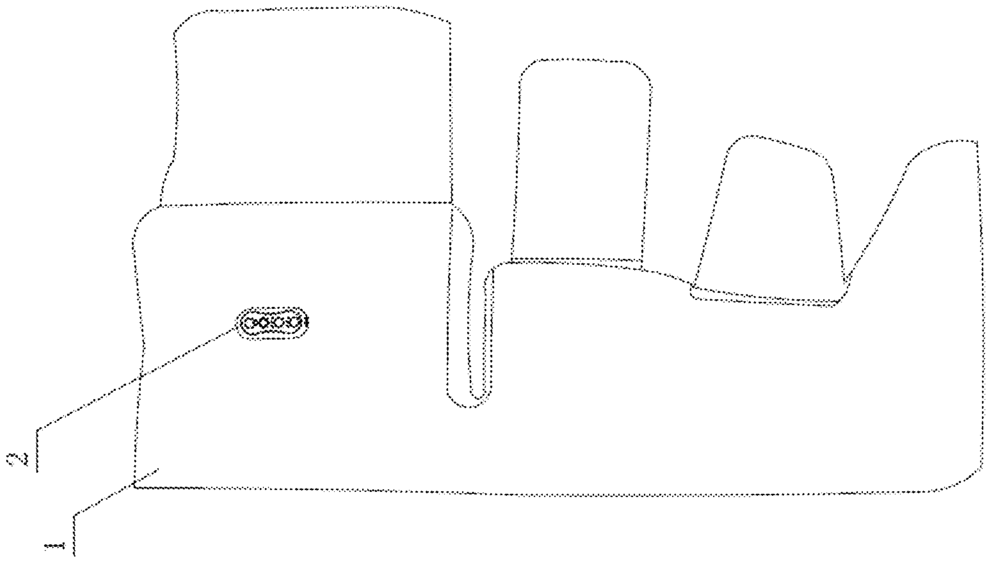
FIG. 8 is a schematic diagram of the fifth embodiment of the present invention.

In addition to the calf, this invention can be also used to cover other body treatment areas, including the foot, leg, arm, buttock, waist, or other body areas. In this fifth embodiment (FIG. 8), the wrap 1 is for the body area of the foot, calf, and thigh.

Other undescribed parts in this fifth embodiment are the same as in the first embodiment.

The Sixth Embodiment

Figure 9:
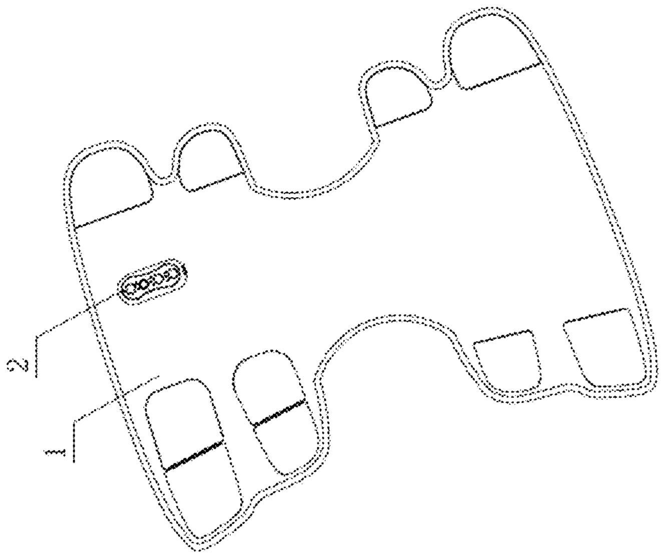
FIG. 9 is a schematic diagram of the sixth embodiment of the present invention.
Figure 10:
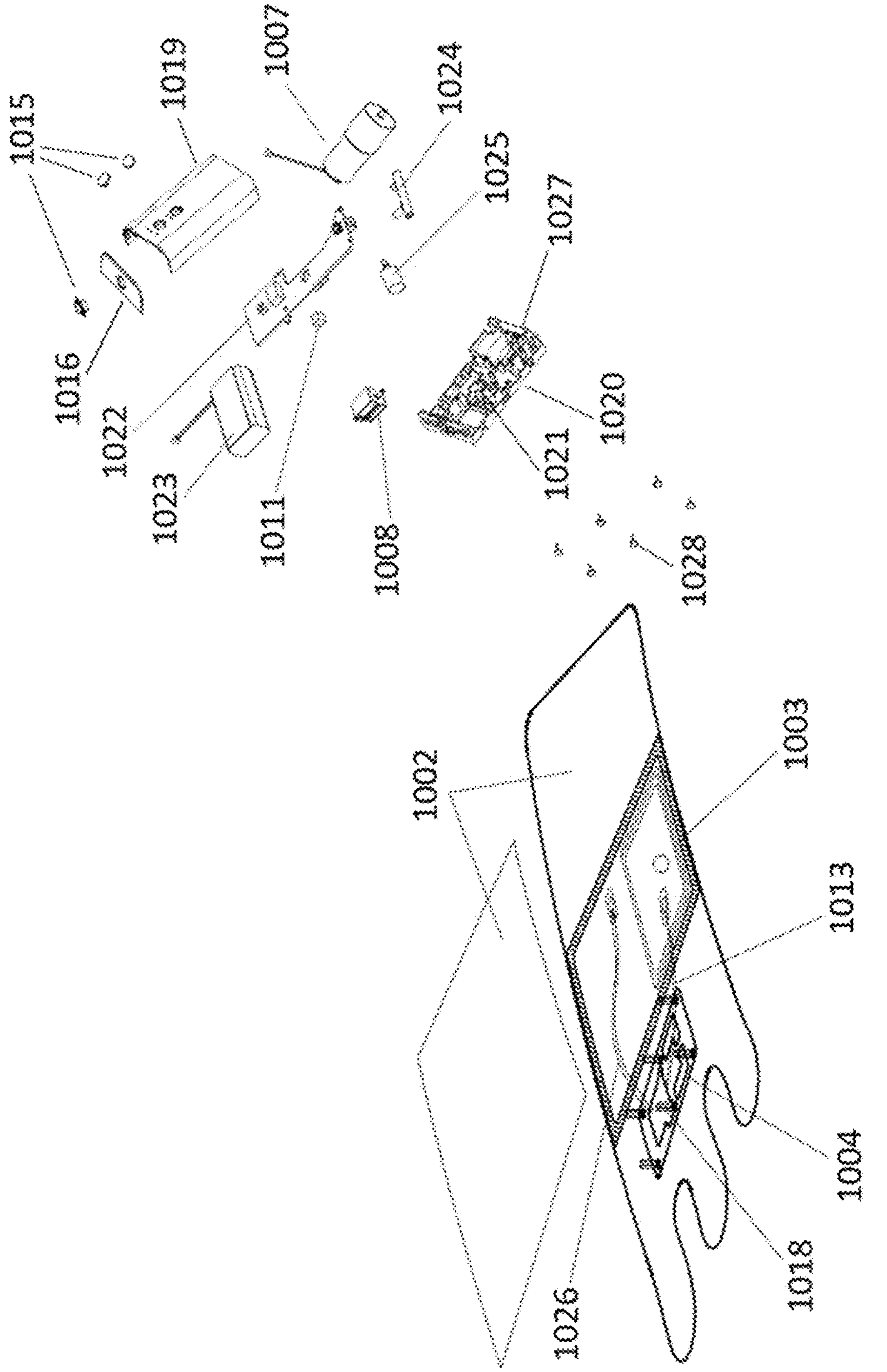
FIG. 10 is a schematic diagram of the exploded structure of the seventh embodiment of the present invention.

In addition to the calf, this invention can be also used to cover other body treatment areas, including the foot, leg, arm, buttock, waist, or other body areas. In this sixth embodiment (FIG. 9), the wrap 1 is for the body area of the arm.

Other undescribed parts in this sixth embodiment are the same as in the first embodiment.

The Seventh Embodiment

A pneumatic physiotherapy apparatus with a unique structure comprising a wrap and an operating unit: wherein a wrap includes at least an outer wrap, an inner component housing, and an inner air bladder set; wherein the operating unit is fixed to the outer wrap; wherein the operating unit is also connected to the inner component housing; and wherein the inner component housing is hidden inside the wrap.

The Eighth Embodiment

The apparatus of the seventh embodiment, further comprising: wherein the operating unit is to operate an inflation motor and an integrated control board inside the inner component housing; wherein the inner air bladder set includes a plurality of air bladders, and each air bladder is inflatable; wherein the inflation motor is controlled by the integrated control board; wherein the inflation motor inflates the inner air bladder set; wherein the inner component housing also contains a solenoid valve and a pressure detection valve; wherein the solenoid valve, the pressure detection valve, and the inflation motor are electrically connected to the integrated control board.

The Ninth Embodiment

The apparatus of the seventh embodiment, further comprising: wherein the inflation motor and integrated control board are electrically powered by a battery inside the inner component housing, an AC adapter outside the inner component housing, or a battery bank outside the inner component housing.

The Tenth Embodiment

The apparatus of the seventh embodiment, further comprising: when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintains the preset pressure for a certain period of time prior to deflation.

The Eleventh Embodiment

The apparatus of the tenth embodiment, further comprising: wherein a pressure protection valve is equipped in the inner component housing; when the pressure inside the inner air bladder set is excessive and beyond an allowable pressure range, the pressure protection valve will be activated, and the excessive pressure will release from the inner air bladder set.

The Twelfth Embodiment

The apparatus of the seventh embodiment, further comprising: wherein the apparatus records and sends out data on how the apparatus is being used; wherein the apparatus sends the data to a computer either through a USB interface, a memory card or Bluetooth; wherein the data can then be analyzed on the computer through artificial intelligence in order to determine optimal patterns for using the apparatus.

The Thirteenth Embodiment

The apparatus of the twelfth embodiment, further comprising: wherein the artificial intelligence can learn the rhythm in which a user enjoys using the apparatus; wherein the artificial intelligence can learn a series of buttons that the user likes being pushed on the apparatus; wherein the artificial intelligence can learn an optimal amount of time that a user wants the apparatus on particular body parts; wherein the artificial intelligence utilizes machine learning, deep learning, or neural networks.

The Fourteenth Embodiment

The apparatus of the seventh embodiment, further comprising: wherein the operating unit is to operate an inflation motor and an integrated control board inside the inner component housing; wherein the inner air bladder set includes a plurality of air bladders, and each air bladder is inflatable; wherein the inflation motor is controlled by the integrated control board; wherein the inflation motor inflates the inner air bladder set; wherein the inner component housing also contains a solenoid valve and a pressure detection valve; wherein the solenoid valve, the pressure detection valve, and the inflation motor are electrically connected to the integrated control board; wherein the inflation motor and integrated control board are electrically powered by a battery inside the inner component housing, an AC adapter outside the inner component housing, or a battery bank outside the inner component housing; when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintains the preset pressure for a certain period of time prior to deflation; wherein a pressure protection valve is equipped in the inner component housing; when the pressure inside the inner air bladder set is excessive and beyond an allowable pressure range, the pressure protection valve will be activated, and the excessive pressure will release from the inner air bladder set.

The Fifteenth Embodiment

The apparatus of the seventh embodiment, further comprising: wherein the operating unit is to operate an inflation motor and an integrated control board inside the inner component housing; wherein the inner air bladder set includes a plurality of air bladders, and each air bladder is inflatable; wherein the inflation motor is controlled by the integrated control board; wherein the inflation motor inflates the inner air bladder set; wherein the inner component housing also contains a solenoid valve and a pressure detection valve; wherein the solenoid valve, the pressure detection valve, and the inflation motor are electrically connected to the integrated control board; wherein the inflation motor and integrated control board are electrically powered by a battery inside the inner component housing, an AC adapter outside the inner component housing, or a battery bank outside the inner component housing; when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintains the preset pressure for a certain period of time prior to deflation; wherein a pressure protection valve is equipped in the inner component housing; when the pressure inside the inner air bladder set is excessive and beyond an allowable pressure range, the pressure protection valve will be activated, and the excessive pressure will release from the inner air bladder set; wherein the apparatus records and sends out data on how the apparatus is being used; wherein the apparatus sends the data to a computer either through a USB interface, a memory card or Bluetooth; wherein the data can then be analyzed on the computer through artificial intelligence in order to determine optimal patterns for using the apparatus; wherein the artificial intelligence can learn the rhythm in which a user enjoys using the apparatus; wherein the artificial intelligence can learn a series of buttons that the user likes being pushed on the apparatus; wherein the artificial intelligence can learn an optimal amount of time that a user wants the apparatus on particular body parts; wherein the artificial intelligence utilizes machine learning, deep learning, or neural networks.

The Sixteenth Embodiment

A pneumatic physiotherapy apparatus with a unique structure comprising a wrap and an operating unit: wherein a wrap includes at least an outer wrap, an inner component housing, and an inner air bladder set; wherein the operating unit is fixed to the outer wrap; wherein the operating unit is also connected to the inner component housing; wherein the inner component housing is hidden inside the wrap; wherein the operating unit is to operate an inflation motor and an integrated control board inside the inner component housing; wherein the inner air bladder set includes a plurality of air bladders, and each air bladder is inflatable; wherein the inflation motor is controlled by the integrated control board; wherein the inflation motor inflates the inner air bladder set; wherein the inner component housing also contains a solenoid valve and a pressure detection valve; wherein the solenoid valve, the pressure detection valve, and the inflation motor are electrically connected to the integrated control board; wherein the inflation motor and integrated control board are electrically powered by a battery inside the inner component housing, an AC adapter outside the inner component housing, or a battery bank outside the inner component housing; when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintain a preset pressure for a certain period of time prior to deflation.

The Seventeenth Embodiment

The apparatus of the sixteenth embodiment, further comprising: wherein the apparatus records and sends out data on how the apparatus is being used; wherein the apparatus sends the data to a computer either through a USB interface, a memory card or Bluetooth; wherein the data can then be analyzed on the computer through artificial intelligence in order to determine optimal patterns for using the apparatus.

The Eighteenth Embodiment

The apparatus of the seventeenth embodiment, further comprising: wherein the artificial intelligence can learn the rhythm in which a user enjoys using the apparatus; wherein the artificial intelligence can learn a series of buttons that the user likes being pushed on the apparatus; wherein the artificial intelligence can learn an optimal amount of time that a user wants the apparatus on particular body parts; wherein the artificial intelligence utilizes machine learning, deep learning, or neural networks.

The Nineteenth Embodiment

A pneumatic physiotherapy apparatus with a unique structure comprising a wrap and an operating unit: wherein a wrap includes at least an outer wrap, an inner component housing, and an inner air bladder set; wherein the operating unit is fixed to the outer wrap; wherein the operating unit is also connected to the inner component housing; wherein the inner component housing is hidden inside the wrap; wherein the operating unit is to operate an inflation motor and an integrated control board inside the inner component housing; wherein the inner air bladder set includes a plurality of air bladders, and each air bladder is inflatable; wherein the inflation motor is controlled by the integrated control board; wherein the inflation motor inflates the inner air bladder set; wherein the inner component housing also contains a solenoid valve and a pressure detection valve; wherein the solenoid valve, the pressure detection valve, and the inflation motor are electrically connected to the integrated control board; wherein the inflation motor and integrated control board are electrically powered by a battery inside the inner component housing, an AC adapter outside the inner component housing, or a battery bank outside the inner component housing; wherein the apparatus records and sends out data on how the apparatus is being used; wherein the apparatus sends the data to a computer either through a USB interface, a memory card or Bluetooth; wherein the data can then be analyzed on the computer through artificial intelligence in order to determine optimal patterns for using the apparatus.

The Twentieth Embodiment

The apparatus of the nineteenth embodiment, further comprising: when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintain a preset pressure for a certain period of time prior to deflation.

The Twenty-First Embodiment

The apparatus of the nineteenth embodiment, further comprising: wherein a pressure protection valve is equipped in the inner component housing; when the pressure inside the inner air bladder set is excessive and beyond an allowable pressure range, the pressure protection valve will be activated, and the excessive pressure will release from the inner air bladder set.

The Twenty-Second Embodiment

The apparatus of the nineteenth embodiment, further comprising: wherein the artificial intelligence can learn the rhythm in which a user enjoys using the apparatus: wherein the artificial intelligence can learn a series of buttons that the user likes being pushed on the apparatus: wherein the artificial intelligence can learn an optimal amount of time that a user wants the apparatus on particular body parts; wherein the artificial intelligence utilizes machine learning, deep learning, or neural networks.

The Twenty-Second Embodiment

The apparatus of the nineteenth embodiment, further comprising: when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintain a preset pressure for a certain period of time prior to deflation; wherein a pressure protection valve is equipped in the inner component housing; when the pressure inside the inner air bladder set is excessive and beyond an allowable pressure range, the pressure protection valve will be activated, and the excessive pressure will release from the inner air bladder set.

The Twenty-Third Embodiment

The apparatus of the nineteenth embodiment, further comprising: when the inflation pressure inside the inner air bladder set reaches a preset value, the pressure detection valve detects and sends signals to the integrated control board; after receiving those signals, the integrated control board stops the inflation motor; after the inflation motor stops, the inner air bladder set immediately deflates, or maintain a preset pressure for a certain period of time prior to deflation; wherein a pressure protection valve is equipped in the inner component housing; when the pressure inside the inner air bladder set is excessive and beyond an allowable pressure range, the pressure protection valve will be activated, and the excessive pressure will release from the inner air bladder set; wherein the artificial intelligence can learn the rhythm in which a user enjoys using the apparatus; wherein the artificial intelligence can learn a series of buttons that the user likes being pushed on the apparatus; wherein the artificial intelligence can learn an optimal amount of time that a user wants the apparatus on particular body parts; wherein the artificial intelligence utilizes machine learning, deep learning, or neural networks.

The Twenty-Fourth Embodiment

Referring to FIGS. 10 to 15, the pneumatic therapy apparatus and method with overlapped compression includes a wrap and a controller 1501. The wrap includes an outer wrap 1002 and an inner air bladder set 1003; the controller 1501 is fixedly connected to (or integrally fixed on) the outer wrap 1002; the inner air bladder set 1003 contains a first air bladder 1105 and a second air bladder 1106 that are overlapped; the controller 1501 contains an inflation motor 1007 and an integrated control board 1022 that are electrically powered by a single battery or multiple batteries inside the controller 1501 or by a battery bank/AC adapter/power supply outside the controller 1501. The inflation motor 1007 that is controlled by the integrated control board 1022 inflates the second air bladder 1106 first, and then inflates the first air bladder 1105 to realize the overlapped compression between the second air bladder 1106 and the first air bladder 1105.

Figure 11:
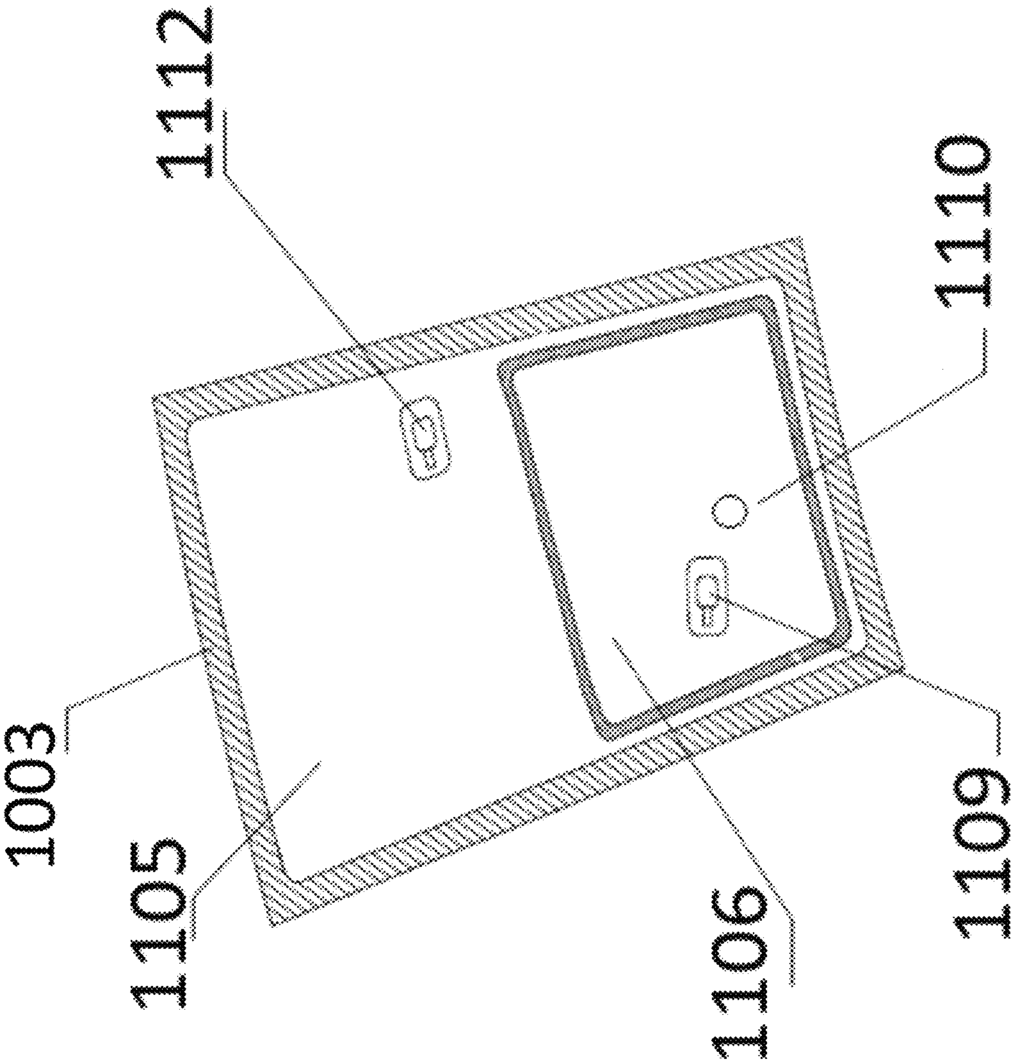
FIG. 11 is a schematic diagram of the inner air bladder set of the seventh embodiment of the present invention.

Specifically, the size of the first air bladder 1105 is larger than that of the second air bladder 1106, and the second air bladder 1106 is located outside the lower section of the first air bladder 1105 (FIG. 11). The boundary of the first air bladder 1105 is seal welded with one or more than one air flow hole 1110 on its lower section; the boundary of the second air bladder 1106 is seal welded on the lower section of the first air bladder 1105, making the second air bladder 1106 cover the air flow hole 1110 on the first air bladder 1105. There is an flow nozzle 1109 on the second air bladder 1106 for the inflation motor 1007 to inflate the second air bladder 1106 first and then the first air bladder 1105. The air flow hole 1110 on the lower section of the first air bladder 1105 creates one or more than one air flow passageway between the first air bladder 1105 and the second air bladder 1106. Through the air flow passageway, the air flow enters from the second air bladder 1106 to the first air bladder 1105 to achieve overlapped compression between the first air bladder 1105 and the second air bladder 1106.

Figure 12:
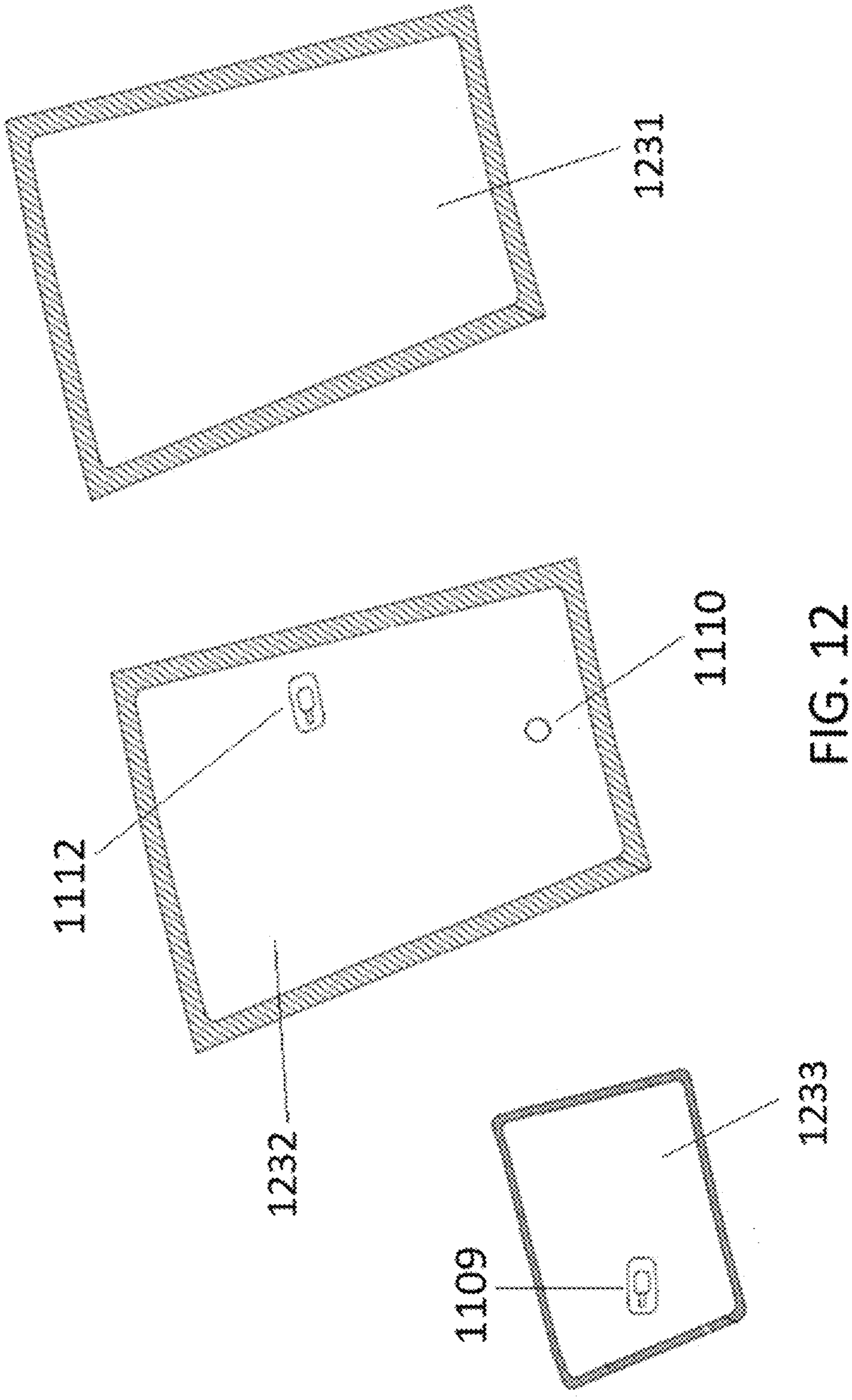
FIG. 12 is a schematic diagram of the exploded structure of the inner air bladder set of the seventh embodiment of the present invention.

It is easy and practical to make the inner air bladder set 1003, which includes a bottom layer 1231 of the first air bladder 1105, a top layer 1232 of the first air bladder 1105, and a top layer 1233 of the second air bladder (FIG. 12). First, the flow nozzle 1109 is sealed welded on the top layer 1233 of the second air bladder 1106. Second, the air flow hole 1110 is made on the lower section of the top layer 1232 of the first air bladder 1105, and the optional nozzle 1112 is sealed welded on the upper section of the top layer 1232 of the first air bladder 1105. Third, the boundary of the second air bladder 1106 is seal weld onto the lower section of the top layer 1232 of the first air bladder 1105. Fourth, the boundary of the top layer 1232 of the first air bladder 1105 is sealed welded to the boundary of a bottom layer 1231 of the first air bladder 1105.

Figure 13:
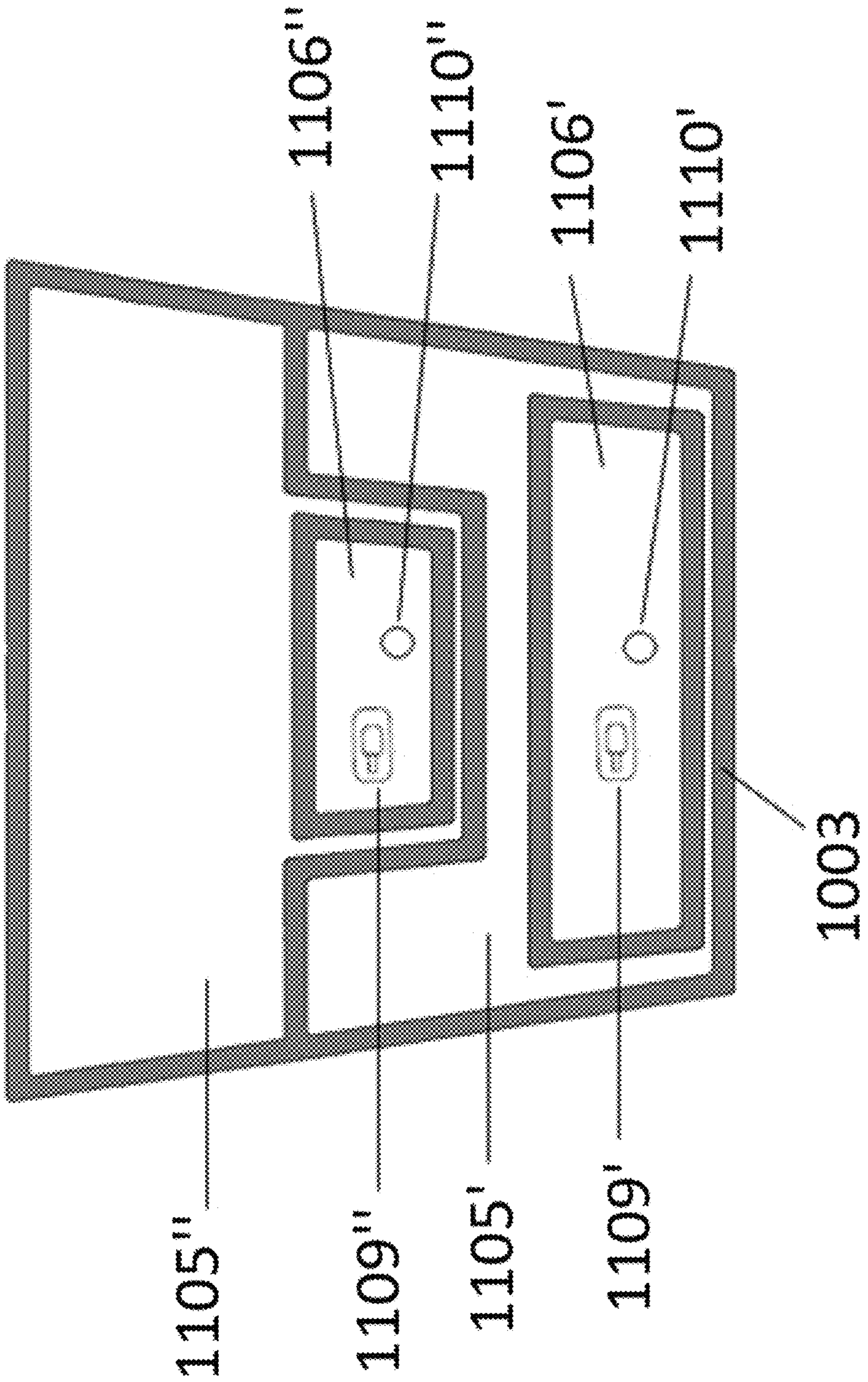
FIG. 13 is a schematic diagram of another inner air bladder set of the seventh embodiment of the present invention.
Figure 14:
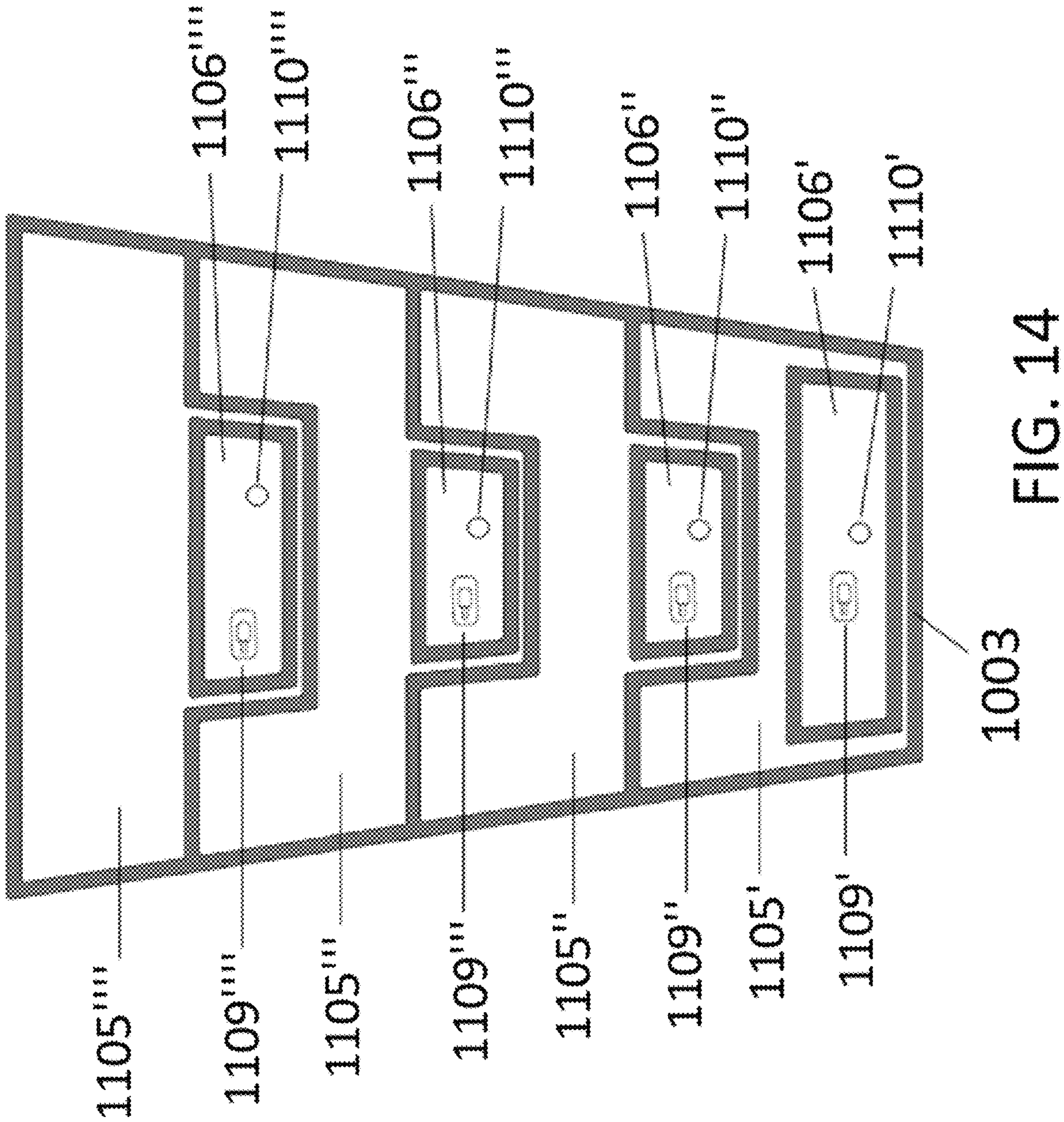
FIG. 14 is a schematic diagram of the third inner air bladder set of the seventh embodiment of the present invention.
Figure 15:
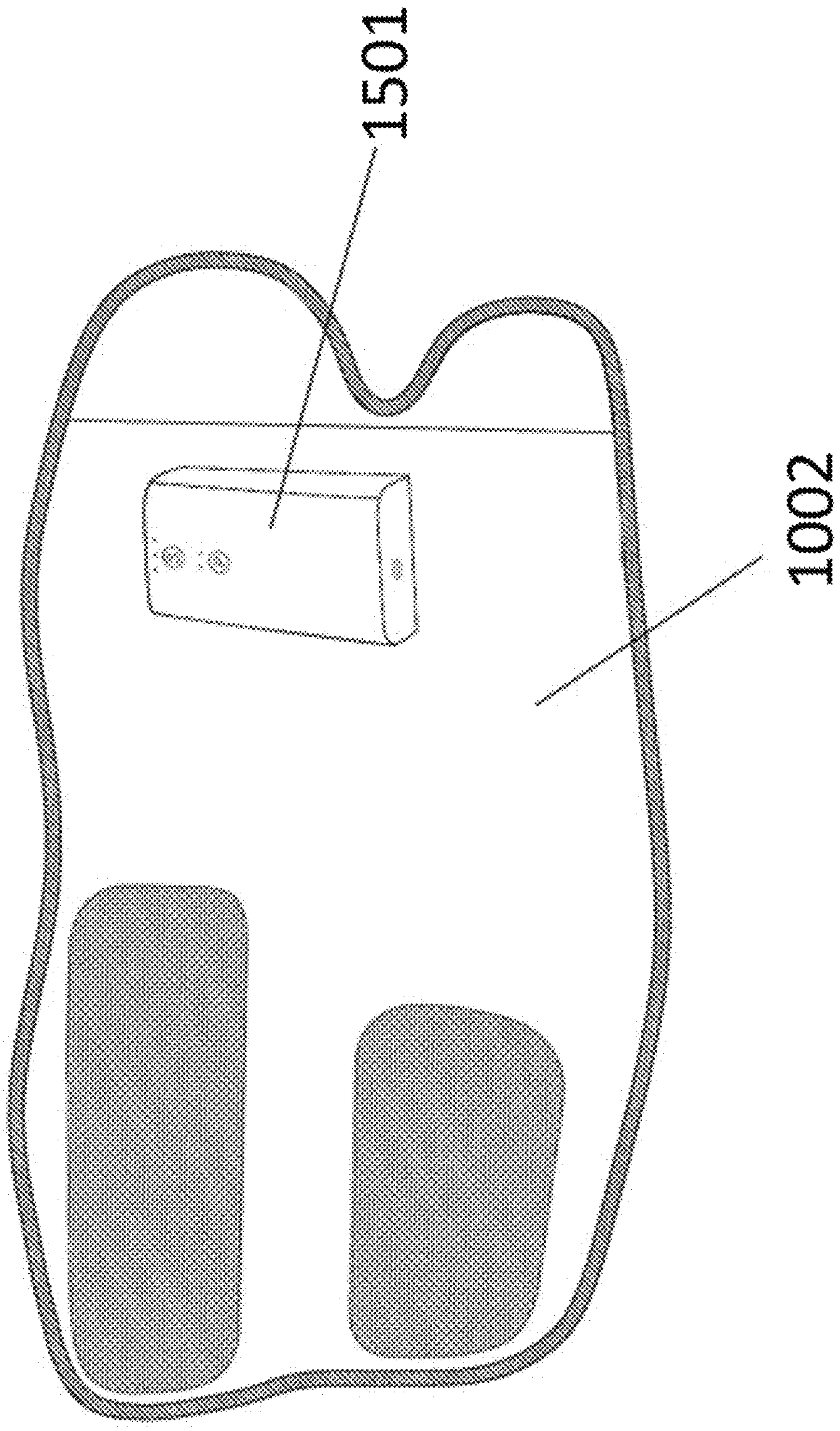
FIG. 15 is a schematic diagram of the integrally fixed structure of the wrap and the controller of the seventh embodiment of the present invention.

The inner air bladder set 1003 in FIGS. 11 and 12 represents one set of the first air bladder 1105 and the second air bladder 1106 overlapped. To cover the large body areas (such as the full leg and the full arm), it will require a large inner air bladder set 1003 with more than one set of the first air bladder 1105 and the second air bladder 1106 overlapped. FIGS. 13 and 14 represents such a large inner air bladder set 1003 with two and four sets of the first air bladder 1105 and the second air bladder 1106 overlapped, respectively. 1105', 1105', 1105''', and 1105'' '' represents the first air bladder in the first, second, third, and fourth sets, respectively; 1106', 1106', 1106''', and 1106'' '' represents the second air bladder in the first, second, third, and fourth sets, respectively: 1109', 1109', 1109''', and 1109'' '' represents the flow nozzle on the second air bladder in the first, second, third, and fourth sets, respectively; 1110', 1110', 1110''', and 1110'' '' represents the air flow hole on the first air bladder in the first, second, third, and fourth sets, respectively. Similarly, it can extend to any sets (such as eight sets) of the first air bladder 1105 and the second air bladder 1106 overlapped, if needed.

There are a first connection tubing 1013 between the flow nozzle 1109 and the inflation motor 1007. The flow nozzle 1109 on the second air bladder 1106 is connected to the inflation motor 1007 through the first connection tubing 1013. The inflation motor 1007 controlled by the integrated control board 1022 generates air flow. The air flow from the inflation motor 1007 enters the second air bladder 1106 through the first connection tubing 1013 and the flow nozzle 1109. When the air pressure in the second air bladder 1106 rises to a certain level, the air flow starts to enter the first air bladder 1105 from the second air bladder 1106 through the air flow passageway.

In order to detect and control the air pressure inside the first air bladder 1105 and the second air bladder 1106, the controller 1501 also contains a solenoid valve 1008 and a pressure detection valve 1011. The solenoid valve 1008, the pressure detection valve 1011, and the inflation motor 1007 are electrically connected to the integrated control board 1022. The first air bladder 1105 includes an optional nozzle 1112 on its upper section. The optional nozzle 1112 not only can release the pressure from the first air bladder 1105 and the second air bladder 1106, but also control the pressure of the first air bladder 1105 and the second air bladder 1106 via the pressure detection valve 1011. If the first air bladder does not include the optional nozzle 1112, the flow nozzle 1109 on the second air bladder 1106 will be used to release the pressure from the first air bladder 1105 and the second air bladder 1106, and to control the pressure of the first air bladder 1105 and the second air bladder 1106 via the pressure detection valve 1011.

There are a second connection tubing 1026 between the optional nozzle 1112 and the pressure detection valve 1011. The optional nozzle 1112 is connected to the pressure detection nozzle 1011 and the solenoid valve 1008 via the second connection tubing 1026. When the inflation pressure inside the first air bladder 1105 and the second air bladder 1106 reaches the preset value, the pressure detection valve 1011 detects and sends signals to the integrated control board 1022. After receiving signals, the integrated control board 1022 will stop the inflation motor 1007. After the inflation motor 1007 stops, the first air bladder 1105 and the second air bladder 1106 will maintain the preset pressure for a certain period of time prior to deflation, or immediately deflate through the optional nozzle 1112, the second connection tubing 1026, and the solenoid valve 1008 in sequence.

In order to avoid the safety concern caused from the excessive pressure in the first air bladder 1105 and the second air bladder 1106, a pressure protection valve 1025 is equipped in the controller 1501. The pressure protection valve 1025 is connected to a multiple-way connector 1024. When the pressure inside the first air bladder 1105 and the second air bladder 1106 is excessive and beyond an allowable pressure range, the pressure protection valve 1025 will be activated, and the excessive pressure will release from the first air bladder 1105 and the second air bladder 1106.

During operation, the inflation motor 1007 and the pressure protection valve 1025 are connected to the multiple-way connector 1024, which is connected to the flow nozzle 1109. The inflation motor 1007 controlled by the integrated control board 1022 first inflates the second air bladder 1106, and then enters the first air bladder 1105 from the second air bladder 1106 through the air flow passageway. This method of inflation achieves an overlapped compression between the first air bladder 1105 and the second air bladder 1106, and effectively avoids blind spots and shortcomings in the prior art. Therefore, users can use the pneumatic therapy apparatus and method of this invention to promote blood flow, treat lymphedema, prevent deep vein thrombosis and other diseases, and improve user experience in the treatment areas (such as limbs).

The controller 1501 also includes a first housing 1019 and a second housing 1020; the first housing 1019 and the second housing 1020 are fixedly connected to each other, and form a cavity 1021 between the two housings. The cavity 1021 covers the inflation motor 1007, the solenoid valve 1008, the pressure detection valve 1011, the multiple-way connector 1024, the pressure protection valve 1025, the integrated control board 1022, and the battery 1023.

For ease of use, a single or multiple control button 1015 is on the front or side of the controller 1501. The control button 1015 can be shaped in many different ways, such as a convex button, a concave button, a flat button, or a touch button. The user can use the control button 1015 to operate the pneumatic therapy apparatus and method with overlapped compression.

A display indication 1016 is arranged on the front or side of the controller 1501. The display indication 1016 can be a digital display, an LCD display screen, or a light indicator. The user can observe the working state of the controller 1501 through the display indication 1016 when in use.

The first connection tubing 1013 and the second connection tubing 1026 in this twenty-fourth embodiment are inside the wrap. The wrap can be used to cover different treatment areas, including the leg, arm, buttock, waist, or a combination of the above. The wrap in this embodiment is for any limb, and is used as an example for description. In use, a user wears the wrap on the limb, and operates the controller 1501 to achieve an overlapped compression between the first air bladder 1105 and the second air bladder 1106. Therefore, this invention of a pneumatic therapy apparatus and method with overlapped compression can promote blood flow, treat lymphedema, and help prevent deep vein thrombosis and other diseases.

In this twenty-fourth embodiment, the connection between the controller 1501 and the wrap is fixedly connected (or integrally fixed) to each other. Specifically, a connecting bracket 1004 is fixedly arranged inside the outer wrap 1002. The connecting bracket 1004 contains several screw posts and/or buckle grooves 1018, and is fixedly connected to the controller 1501 through the screw posts, buckle grooves 1018, and/or screws 1028 to form an integrally fixed connection between the controller 1501 and the wrap.

In order for the user to charge the built-in battery inside the controller 1501 or provide the power supply to the controller 1501, there is a charging/power port 1027 on the controller. In addition, this port 1027 can be also used to transfer and view the usage data of the pneumatic therapy apparatus and method with overlapped compression.

In an alternative embodiment, a memory card can be optionally provided on the front or side of the controller 1501. When the memory card is plugged into the front or side of the controller 1501, the memory card can record the usage data of the pneumatic therapy apparatus and method with overlapped compression for the user to read.

In another alternative embodiment, the controller 1501 is optionally equipped with a Bluetooth module, and the user can wirelessly connect a smart device (such as a smart phone) to the Bluetooth module to read the usage data of the pneumatic therapy apparatus and method with overlapped compression.

The Twenty-Fifth Embodiment

In this twenty-fifth embodiment, the controller 1501 and the wrap are connected detachably, and the controller 1501 can be attached to and detached from the wrap.

Figure 16:
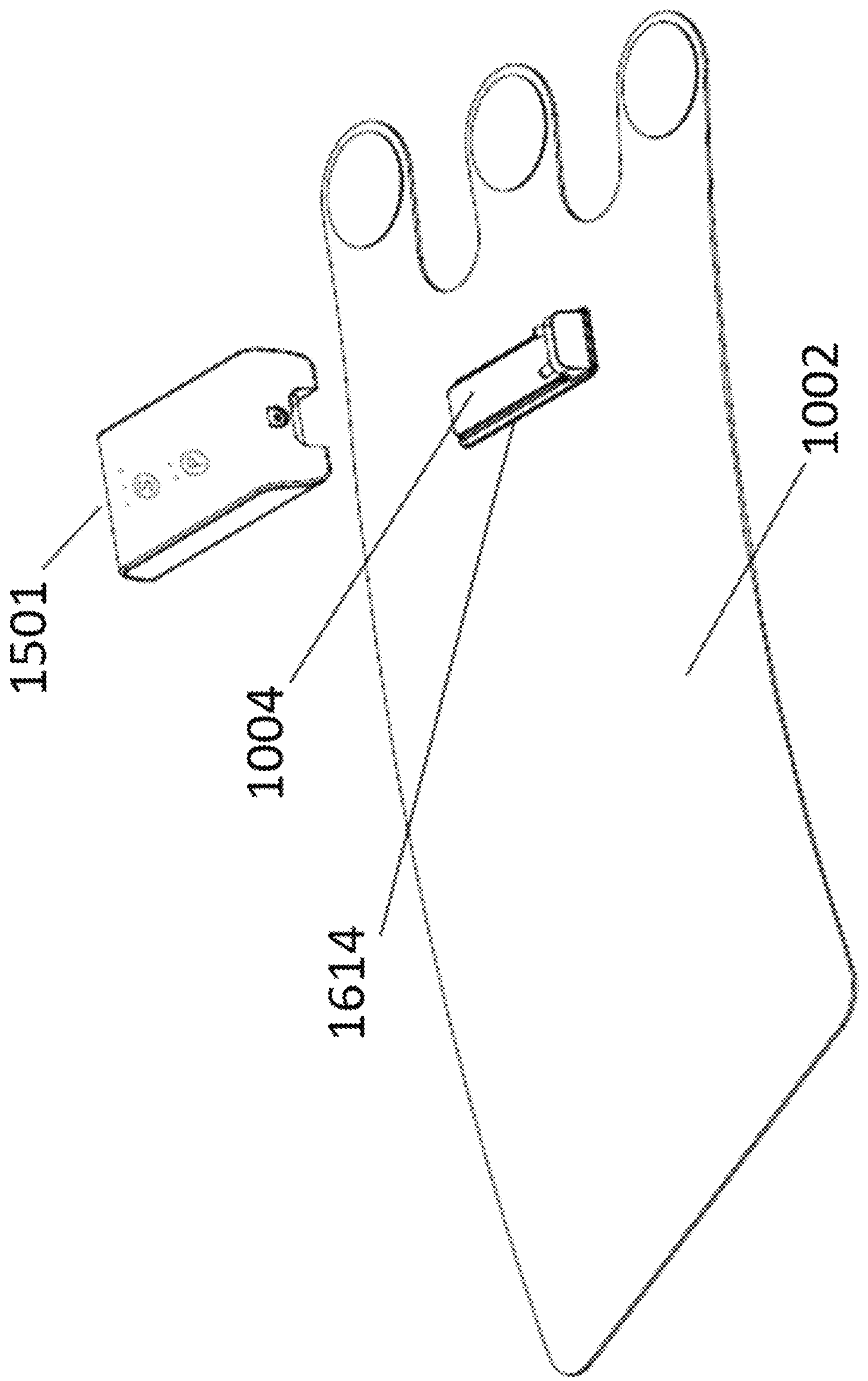
FIG. 16 is a schematic diagram of the detachable structure of the wrap and the controller of the nineth embodiment of the present invention.

Referring to FIG. 16, the difference between this embodiment and the twenty-fourth embodiment is that the controller 1501 is detachably connected to the outer wrap 2 in this twenty-fifth embodiment. Therefore, the controller 1501 of the same or different look can be detachably used on the wrap of different types.

Specifically, the controller 1501 of another look and the wrap of another look are detachably connected. The connecting bracket 1004 is fastened on the wrap and contains a plurality of sliding grooves 1614, snapping grooves, magnetic buckles, or concealed buckles. The connecting bracket 1004 is detachably connected to the controller 1501 through the sliding grooves 1614, snapping grooves, magnetic buckles, or concealed buckle to form a detachable connection between the controller 1501 and the wrap.

Other undescribed parts in this twenty-fifth embodiment are the same as in the twenty-fourth embodiment.

The Twenty-Sixth Embodiment

In this twenty-sixth embodiment, an external tubing is located between the controller 1501 and the wrap, and the external tubing is used to form a separate connection between the controller 1501 and the wrap.

Figure 17:
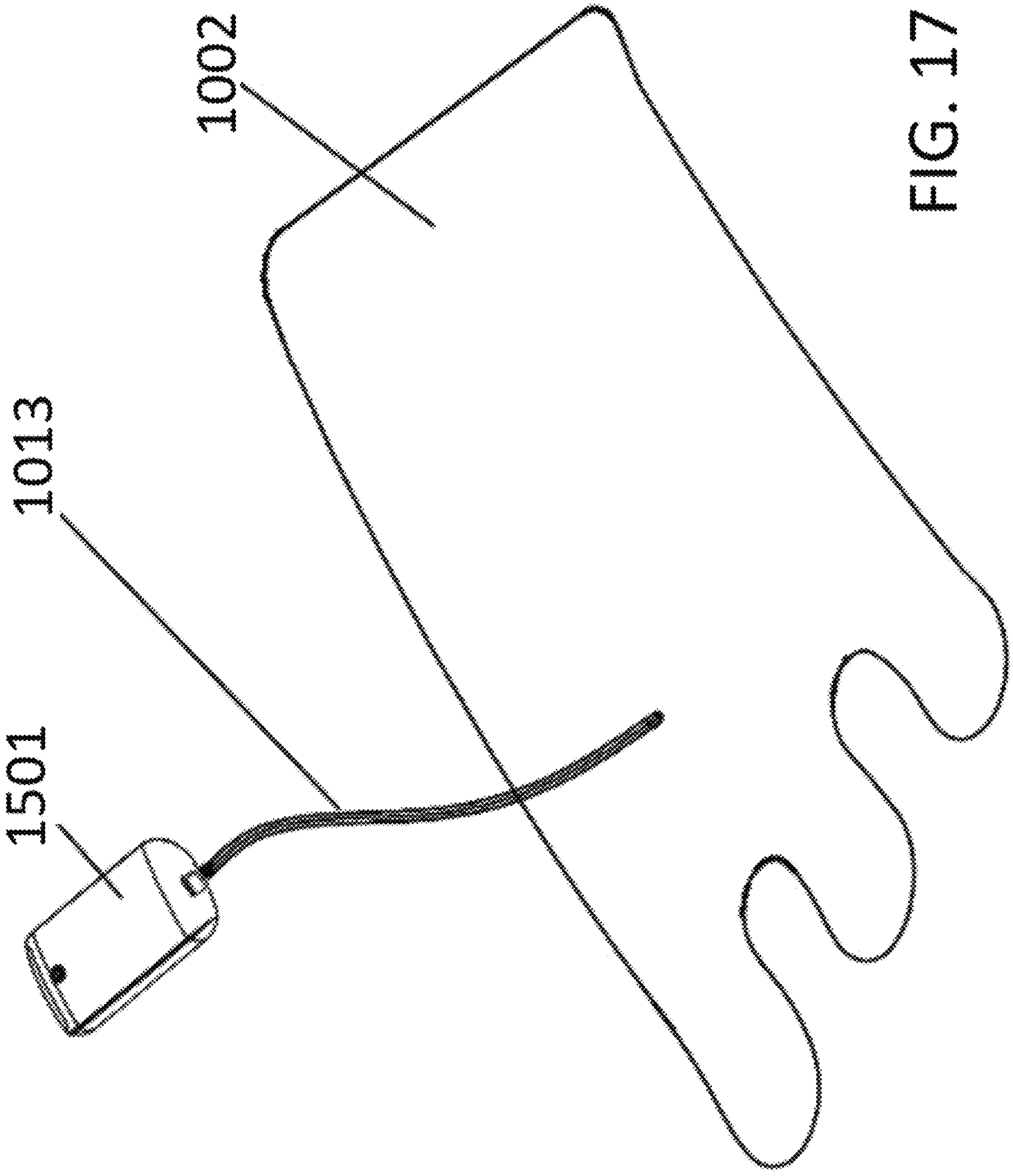
FIG. 17 is a schematic diagram of the separated structure of the wrap and the controller of the tenth embodiment of the present invention.

Referring to FIG. 17, the difference between this twenty-sixth embodiment and the twenty-fourth embodiment is the controller 1501 of the same or different look and the wrap of different types are separately connected via an external tubing.

Specifically, the first connection tubing 1013 is outside the wrap. One end of the first connection tubing 1013 is connected to the inflation motor 1007 of the controller 1501 of another look, and the other end of the first connection tubing 1013 is connected to the flow nozzle 1109 inside the wrap. The controller 1501 and the wrap are connected to each other through the first connection tubing 1013 outside the wrap to form a separate connection between the controller 1501 and the wrap.

Other undescribed parts in this twenty-sixth embodiment are the same as in the twenty-fourth embodiment.

In another embodiment, a pneumatic therapy apparatus and method with overlapped compression comprising a wrap and a controller:

- wherein the wrap includes an outer wrap and an inner air bladder set;
- wherein the controller is fixedly connected to the outer wrap;
- wherein the controller contains an inflation motor and an integrated control board;
- wherein the inflation motor is controlled by the integrated control board;
- wherein the inner air bladder set includes the first air bladder and the second air bladder that are overlapped;
- wherein the size of the first air bladder is bigger than that of the second air bladder, and the second air bladder is located outside the lower section of the first air bladder;
- wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
- wherein a connecting bracket is fixedly arranged inside the outer wrap;
- wherein the connecting bracket contains several screw posts and/or buckle grooves, and is fixedly connected to the controller through the screw posts and/or buckle grooves to form an integrally fixed connection between the controller and the wrap.

In another embodiment, a pneumatic therapy apparatus and method with overlapped compression comprising a wrap and a controller:

- wherein the wrap includes an outer wrap and an inner air bladder set;
- wherein the controller is fixedly connected to the outer wrap;
- wherein the controller contains an inflation motor and an integrated control board;
- wherein the inflation motor is controlled by the integrated control board;
- wherein the inner air bladder set includes the first air bladder and the second air bladder that are interconnected and overlapped;
- wherein the size of the first air bladder is bigger than that of the second air bladder, and the second air bladder is located outside the lower section of the first air bladder;
- wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
- wherein the inflation motor inflates the second air bladder first and then the first air bladder to achieve overlapped compression between the second air bladder and the first air bladder;
- wherein a connecting bracket is fixedly arranged inside the outer wrap;
- wherein the connecting bracket contains several screw posts and/or buckle grooves, and is fixedly connected to the controller through the screw posts and/or buckle grooves to form an integrally fixed connection between the controller and the wrap;
- wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:

- wherein the wrap includes an outer wrap and an inner air bladder set;
- wherein the controller is detachably connected to the outer wrap;
- wherein the controller contains an inflation motor and an integrated control board; wherein the inflation motor is controlled by the integrated control board;
- wherein the inner air bladder set includes the first air bladder and the second air bladder that are overlapped;
- wherein the size of the first air bladder is bigger than that of the second air bladder, and the second air bladder is located outside the lower section of the first air bladder;
- wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
- wherein the inflation motor inflates the second air bladder first and then the first air bladder to achieve overlapped compression between the second air bladder and the first air bladder; wherein a connecting bracket is fixedly arranged on the outer wrap;
- wherein the connecting bracket contains a number of sliding grooves, snapping grooves, magnetic buckles, or concealed buckles;
- and wherein the connecting bracket is detachably connected to the controller through the sliding grooves, snapping grooves, magnetic buckles, or concealed buckles, to form a detachable connection between the controller and the wrap.

In another embodiment, a pneumatic therapy apparatus and method with overlapped compression comprising a wrap and a controller:

- wherein the wrap includes an outer wrap and an inner air bladder set;
- wherein the controller is detachably connected to the outer wrap;
- wherein the controller contains an inflation motor and an integrated control board;
- wherein the inflation motor is controlled by the integrated control board;
- wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder; wherein the inflation motor inflates the second air bladder first and then the first air bladder to achieve overlapped compression between the second air bladder and the first air bladder;

wherein a connecting bracket is fixedly arranged on the outer wrap;

wherein the connecting bracket contains a number of sliding grooves, snapping grooves, magnetic buckles, or concealed buckles;

and wherein the connecting bracket is detachably connected to the controller through the sliding grooves, snapping grooves, magnetic buckles, or concealed buckles, to form a detachable connection between the controller and the wrap;

wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:

wherein the wrap includes an outer wrap and an inner air bladder set;

wherein the controller is separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein an external air tubing is provided between the controller and the wrap, and the external air tubing is used to form a separate connection between the controller and the wrap.

In another embodiment, a pneumatic therapy apparatus and method with overlapped compression comprising a wrap and a controller:

wherein the wrap includes an outer wrap and an inner air bladder set;

wherein the controller is separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein an external air tubing is provided between the controller and the wrap, and the external air tubing is used to form a separate connection between the controller and the wrap;

wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:

wherein the wrap includes an outer wrap and an inner air bladder set;

wherein the controller is fixedly connected to, detachably connected to, or separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be integrally fixed, attached/detached, or separated via tubing.

In another embodiment, a pneumatic therapy apparatus and method with overlapped compression comprising a wrap and a controller:

wherein the wrap includes an outer wrap and an inner air bladder set;

wherein the controller is fixedly connected to the outer wrap;

wherein the controller contains an inflation motor and an integrated control board;

wherein the inflation motor is controlled by the integrated control board;

wherein the inner air bladder set includes the first air bladder and the second air bladder that are overlapped;
wherein the size of the first air bladder is bigger than that of the second air bladder, and the second air bladder is located outside the lower section of the first air bladder;
wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
wherein the inflation motor inflates the second air bladder first and then the first air bladder to achieve overlapped compression between the second air bladder and the first air bladder;
wherein the connection between the controller and the wrap can be integrally fixed;
wherein a connecting bracket is fixedly arranged inside the outer wrap;
wherein the connecting bracket contains several screw posts and/or buckle grooves, and is fixedly connected to the controller through the screw posts and/or buckle grooves to form an integrally fixed connection between the controller and the wrap.

In another embodiment, a pneumatic therapy apparatus and method with overlapped compression comprising a wrap and a controller:
wherein the wrap includes an outer wrap and an inner air bladder set;
wherein the controller is fixedly connected to the outer wrap;
wherein the controller contains an inflation motor and an integrated control board; wherein the inflation motor is controlled by the integrated control board;
wherein the inner air bladder set includes the first air bladder and the second air bladder that are overlapped;
wherein the size of the first air bladder is bigger than that of the second air bladder, and the second air bladder is located outside the lower section of the first air bladder;
wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
wherein the inflation motor inflates the second air bladder first and then the first air bladder to achieve overlapped compression between the second air bladder and the first air bladder;
wherein the connection between the controller and the wrap can be integrally fixed;
wherein a connecting bracket is fixedly arranged inside the outer wrap;
wherein the connecting bracket contains several screw posts and/or buckle grooves, and is fixedly connected to the controller through the screw posts and/or buckle grooves to form an integrally fixed connection between the controller and the wrap;
wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:
wherein the wrap includes an outer wrap and an inner air bladder set;
wherein the controller is detachably connected to the outer wrap;
wherein the controller contains an inflation motor and an integrated control board;
wherein the inflation motor is controlled by the integrated control board;
wherein the inner air bladder set includes the first air bladder and the second air bladder that are overlapped;
wherein the size of the first air bladder is bigger than that of the second air bladder, and the second air bladder is located outside the lower section of the first air bladder;
wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
wherein the inflation motor inflates the second air bladder first and then the first air bladder to achieve overlapped compression between the second air bladder and the first air bladder;
wherein the connection between the controller and the wrap can be attached/detached; wherein a connecting bracket is fixedly arranged on the outer wrap;
wherein the connecting bracket contains a number of sliding grooves, snapping grooves, magnetic buckles, or concealed buckles;
and wherein the connecting bracket is detachably connected to the controller through the sliding grooves, snapping grooves, magnetic buckles, or concealed buckles, to form a detachable connection between the controller and the wrap.

In another embodiment, a pneumatic therapy apparatus and method with overlapped compression comprising a wrap and a controller:
wherein the wrap includes an outer wrap and an inner air bladder set;
wherein the controller is detachably connected to the outer wrap;
wherein the controller contains an inflation motor and an integrated control board;
wherein the inflation motor is controlled by the integrated control board;
wherein the inner air bladder set includes the first air bladder and the second air bladder that are overlapped;
wherein the size of the first air bladder is bigger than that of the second air bladder, and the second air bladder is located outside the lower section of the first air bladder;
wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
wherein the inflation motor inflates the second air bladder first and then the first air bladder to achieve overlapped compression between the second air bladder and the first air bladder;
wherein the connection between the controller and the wrap can be attached/detached;
wherein a connecting bracket is fixedly arranged on the outer wrap;
wherein the connecting bracket contains a number of sliding grooves, snapping grooves, magnetic buckles, or concealed buckles;

wherein the connecting bracket is detachably connected to the controller through the sliding grooves, snapping grooves, magnetic buckles, or concealed buckles, to form a detachable connection between the controller and the wrap;

wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:

wherein the wrap includes an outer wrap and an inner air bladder set;

wherein the controller is separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be separated via tubing;

wherein an external air tubing is provided between the controller and the wrap, and the external air tubing is used to form a separate connection between the controller and the wrap.

In another embodiment, a pneumatic therapy apparatus and method with overlapped compression comprising a wrap and a controller:

wherein the wrap includes an outer wrap and an inner air bladder set;

wherein the controller is separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be separated via tubing;

wherein an external air tubing is provided between the controller and the wrap, and the external air tubing is used to form a separate connection between the controller and the wrap;

wherein the controller contains a USB interface on its front or side for transferring the usage data, a pluggable memory card on its front or side for recording the usage data, or a Bluetooth module inside for transferring the usage data.

In another embodiment, a pneumatic therapy apparatus and method with overlapped compression comprising a wrap and a controller:

wherein the wrap includes an outer wrap and an inner air bladder set;

wherein the controller is fixedly connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be integrally fixed.

In another embodiment, a pneumatic therapy apparatus and method with overlapped compression comprising a wrap and a controller:

wherein the wrap includes an outer wrap and an inner air bladder set;

wherein the controller is detachably connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be detachably fixed.

In another embodiment, a pneumatic therapy apparatus and method with overlapped compression comprising a wrap and a controller:

wherein the wrap includes an outer wrap and an inner air bladder set;

wherein the controller is separately connected to the outer wrap;

wherein the controller contains an inflation motor and an integrated control board;

wherein the inflation motor is controlled by the integrated control board;

wherein the inner air bladder set includes the first air bladder and the second air bladder that are overlapped;

wherein the size of the first air bladder is bigger than that of the second air bladder, and the second air bladder is located outside the lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the inflation motor inflates the second air bladder first and then the first air bladder to achieve overlapped compression between the second air bladder and the first air bladder;

wherein the connection between the controller and the wrap can be separated via tubing.

The above are the preferred solutions of the invention, showing and describing the basic principles, main features and advantages of the invention. Those skilled in the art should understand that the present invention is not limited by the above-mentioned embodiments. The above-mentioned embodiments and description only illustrate the principle of the present invention. There will be various changes and improvements; these changes and improvements fall within the scope of the claimed invention, which is defined by the appended claims and their equivalents.

What is claimed is:

1. A pneumatic therapy apparatus with overlapped compression comprising a wrap and a controller:

wherein the wrap includes an outer wrap and an inner air bladder set;

wherein the controller is fixedly connected to, detachably connected to, or separately connected to the outer wrap;

wherein the controller is connected to an inner component housing, and the inner component housing contains an inflation motor and an integrated control board;

wherein the inflation motor is controlled by the integrated control board;

wherein the inner air bladder set includes one or more than one set of a first air bladder and a second air bladder that are overlapped;

wherein the size of the first air bladder is bigger than that of the second air bladder, and the second air bladder is welded and located outside a lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein the air flow hole on the lower section of the first air bladder creates one or more than one air flow passageway between the first air bladder and the second air bladder;

wherein there is a flow nozzle directly connected to the second air bladder without any part of the flow nozzle going through the first air bladder for the inflation motor to inflate the second air bladder first and then the first air bladder; wherein through the air flow passageway, the air flow enters the first air bladder from the second air bladder to achieve overlapped compression between the first air bladder and the second air bladder;

wherein the second air bladder is located on a side of the first air bladder that is farther away from a human body while using, and the second air bladder is completely overlapped on the side of the first air bladder; wherein the inner component housing is hidden inside the outer wrap; wherein the controller is outside the outer wrap; wherein the inner bladder set is adjacent to the inner component housing; wherein the outer wrap is between the controller and the inner component housing; wherein the wrap includes an optional patch outside to provide hot/warm and/or cold/cool;

the inner component housing is hidden inside the outer wrap;

the controller is outside the wrap;

the inner air bladder set is adjacent to the inner component housing;

the outer wrap is between the controller and the inner component housing;

the wrap includes an optional patch outside to provide hot/warm and/or cold/cool; and wherein the inner component housing contains a valve.

2. The system of claim 1, further comprising:

wherein there are a first connection tubing between the flow nozzle and the inflation motor;

wherein the flow nozzle is connected to the inflation motor through the first connection tubing;

wherein the inflation motor generates air flow;

wherein the air flow from the inflation motor enters the second air bladder through the first connection tubing and the flow nozzle;

wherein when the air pressure in the second air bladder rises to a certain level, the air flow starts to enter the first air bladder from the second air bladder through the air flow passageway.

3. The system of claim 2, further comprising:

wherein the controller contains a solenoid valve and a pressure detection valve;

wherein the solenoid valve, the pressure detection valve, and the inflation motor are electrically connected to the integrated control board;

wherein the first air bladder includes an second nozzle;

wherein there is a second connection tubing between the second nozzle and the pressure detection valve;

wherein the second nozzle is connected to the pressure detection valve via the second connection tubing;

wherein when the inflation pressure inside the first air bladder and the second air bladder reaches a preset value, the pressure detection valve detects and sends signals to the integrated control board;

wherein after receiving signals, the integrated control board stops the inflation motor;

wherein after the inflation motor stops, the first air bladder and the second air bladder maintain the inflation pressure at the preset value for a certain period of time prior to deflation, or immediately deflate through the flow or second nozzle, the connection tubing, and the solenoid valve in sequence.

4. The system of claim 1, further comprising a single or multiple control button on the front or side of the controller;

wherein the control button is a convex button, a concave button, a flat button, or a touch button.

5. The system of claim 1, further comprising:

a display indication is arranged on the front or side of the controller;

wherein the display indication is a digital display, an LCD display screen, or a light indicator.

6. The system of claim 1, further comprising:

wherein the wrap is used to cover different treatment areas, including leg, arm, foot, hand, head, buttock, waist, abdomen, back, or a combination of the above.

7. The system of claim 1, further comprising:

when the controller is fixedly connected to the outer wrap, then:

wherein a connecting bracket is fixedly arranged inside the outer wrap;

wherein the connecting bracket contains several screw posts and/or buckle grooves, and is fixedly connected to the controller through the screw posts and/or buckle grooves to form an integrally fixed connection between the controller and the wrap;

when the controller is detachably connected to the outer wrap, then:

wherein a connecting bracket is fixedly arranged on the outer wrap;

wherein the connecting bracket contains a number of sliding grooves, snapping grooves, magnetic buckles, or concealed buckles;

and wherein the connecting bracket is detachably connected to the controller through the sliding grooves, snapping grooves, magnetic buckles, or concealed buckles, to form a detachable connection between the controller and the wrap;

when the controller is separately connected to the outer wrap, then:

wherein an external air tubing is provided between the controller and the wrap, and the external air tubing is used to form a separate connection between the controller and the wrap.

8. The system of claim 1, further comprising:

wherein the controller contains a USB interface on its front or side for transferring the usage data, a pluggable memory card on its front or side for recording the usage data, or a Bluetooth module inside for transferring the usage data.

9. A pneumatic therapy apparatus with overlapped compression comprising a wrap and a controller:

wherein the wrap includes an outer wrap and an inner air bladder set;

wherein the controller is fixedly connected to, detachably connected to, or separately connected to the outer wrap;

wherein the controller is connected to an inner component housing, and the inner component housing contains an inflation motor and an integrated control board;

wherein the inflation motor is controlled by the integrated control board;

wherein the inner air bladder set includes one or more than one set of a first air bladder and a second air bladder that are overlapped;

wherein the size of the first air bladder is bigger than that of the second air bladder, and the second air bladder is welded and located outside a lower section of the first air bladder;

wherein the boundary of the first air bladder is seal welded with one or more than one air flow hole on its lower section, and the boundary of the second air bladder is seal welded on the lower section of the first air bladder, making the second air bladder cover the air flow hole on the first air bladder;

wherein there is a flow nozzle directly connected to the second air bladder without any part of the flow nozzle going through the first air bladder for the inflation motor to inflate the second air bladder first and then the first air bladder;

wherein the air flow hole on the lower section of the first air bladder creates one or more than one air flow passageway between the first air bladder and the second air bladder;

wherein through the air flow passageway, the air flow enters the first air bladder from the second air bladder to achieve overlapped compression between the first air bladder and the second air bladder;

wherein there are a first connection tubing between the flow nozzle and the inflation motor;

wherein the flow nozzle is connected to the inflation motor through the first connection tubing;

wherein the inflation motor generates air flow;

wherein the air flow from the inflation motor enters the second air bladder through the first connection tubing and the flow nozzle;

wherein when the air pressure in the second air bladder rises to a certain level, the air flow starts to enter the first air bladder from the second air bladder through the air flow passageway;

wherein the second air bladder is located on a side of the first air bladder that is farther away from a human body while using, and the second air bladder is completely overlapped on the side of the first air bladder; wherein the inner component housing is hidden inside the outer wrap; wherein the controller is outside the outer wrap; wherein the inner bladder set is adjacent to the inner component housing; wherein the outer wrap is between the controller and the inner component housing; wherein the wrap includes an optional patch outside to provide hot/warm and/or cold/cool;

the inner component housing is hidden inside the outer wrap;

the controller is outside the wrap;

the inner air bladder set is adjacent to the inner component housing;

the outer wrap is between the controller and the inner component housing;

the wrap includes an optional patch outside to provide hot/warm and/or cold/cool; and wherein the inner component housing contains a valve.

10. A pneumatic therapy apparatus with overlapped compression comprising a wrap and a controller:

wherein the wrap includes an outer wrap and an inner air bladder set;

wherein the controller is fixedly connected to, detachably connected to, or separately connected to the outer wrap;

wherein the controller is connected to an inner component housing, and the inner component housing contains an inflation motor and an integrated control board;
wherein the inflation motor is controlled by the integrated control board;
wherein the inner air bladder set includes one or more than one set of a first air bladder and a second air bladder that are overlapped;
wherein the size of the first air bladder is bigger than that of the second air bladder, and the second air bladder is welded and located outside a lower section of the first air bladder;
wherein the boundary of the first air bladder is seal welded with one or more than one air flow hole on its lower section, and the boundary of the second air bladder is seal welded on the lower section of the first air bladder, making the second air bladder cover the air flow hole on the first air bladder;
wherein there is a flow nozzle directly connected to the second air bladder without any part of the flow nozzle going through the first air bladder for the inflation motor to inflate the second air bladder first and then the first air bladder;
wherein the air flow hole on the lower section of the first air bladder creates one or more than one air flow passageway between the first air bladder and the second air bladder;
wherein through the air flow passageway, the air flow enters the first air bladder from the second air bladder to achieve overlapped compression between the first air bladder and the second air bladder;
wherein there are a first connection tubing between the flow nozzle and the inflation motor;
wherein the flow nozzle is connected to the inflation motor through the first connection tubing;
wherein the inflation motor generates air flow;
wherein the air flow from the inflation motor enters the second air bladder through the first connection tubing and the flow nozzle;
wherein when the air pressure in the second air bladder rises to a certain level, the air flow starts to enter the first air bladder from the second air bladder through the air flow passageway;
wherein the controller contains a solenoid valve and a pressure detection valve;
wherein the solenoid valve, pressure detection valve, and the inflation motor are electrically connected to the integrated control board;
wherein the first air bladder includes an second nozzle;
wherein there are a second connection tubing between the second nozzle and the pressure detection valve;
wherein the second nozzle is connected to the pressure detection valve via the second connection tubing;
wherein when the inflation pressure inside the first air bladder and the second air bladder reaches a preset value, the pressure detection valve detects and sends signals to the integrated control board;
wherein after receiving signals, the integrated control board stops the inflation motor;
wherein after the inflation motor stops, the first air bladder and the second air bladder maintain the inflation pressure at the preset value for a certain period of time prior to deflation, or immediately deflate through the flow or second nozzle, the connection tubing, and the solenoid valve in sequence;
wherein the wrap is used to cover different treatment areas, including leg, arm, foot, hand, head, buttock, waist, abdomen, back, or a combination of the above;
wherein the second air bladder is located on a side of the first air bladder that is farther away from a human body while using, and the second air bladder is completely overlapped on the side of the first air bladder; wherein the inner component housing is hidden inside the outer wrap; wherein the controller is outside the outer wrap; wherein the inner bladder set is adjacent to the inner component housing; wherein the outer wrap is between the controller and the inner component housing; wherein the wrap includes an optional patch outside to provide hot/warm and/or cold/cool; the inner component housing is hidden inside the outer wrap;
the controller is outside the wrap;
the inner air bladder set is adjacent to the inner component housing;
the outer wrap is between the controller and the inner component housing;
the wrap includes an optional patch outside to provide hot/warm and/or cold/cool; and wherein the inner component housing contains a valve.

* * * * *